United States Patent Office 3,639,590
Patented Feb. 1, 1972

3,639,590
ANTIBACTERIAL COMPOSITION CONTAINING
(—) (CIS-1,2-EPOXYPROPYL) PHOSPHORIC ACID
David Hendlin, Springfield, and Edward O. Stapley, Spotswood, N.J., and Sagrario Mochales del Val and Justo Martinez Mata, Madrid, Spain, assignors to Merck & Co., Inc., Rahway, N.J.
No Drawing. Continuation-in-part of applications Ser. No. 655,757, July 25, 1967, and Ser. No. 679,165, Oct. 30, 1967. This application May 9, 1968, Ser. No. 728,059
Int. Cl. A61k 21/00
U.S. Cl. 424—203    9 Claims

ABSTRACT OF THE DISCLOSURE (—)(Cis-1,2-epoxypropyl)-phosphonic acid, a water soluble acidic substance, and its salts are active against both gram-positive and gram-negative bacteria. The antibiotic is produced by growing newly-found and hitherto undescribed strains of Streptomyces on suitable fermentation mediums.

CROSS REFERENCE TO RELATED APPLICATIONS

This is a continuation-in-part of copending applications, Ser. No. 655,757 filed July 25, 1967, now abandoned and Ser. No. 679,165, filed Oct. 30, 1967, now abandoned.

BACKGROUND OF THE INVENTION

The discovery of the remarkable antibiotic properties of penicillin stimulated great interest in this field which has resulted in the finding of many other valuable antibiotic substances such as: streptomycin, gramicidin, subtilin, bacitracin, chlortetracycline, oxytetracycline and the like. In general, such antibiotics are particularly active against certain gram-negative bacteria, others are active against gram-positive bacteria, and some are active against both gram-negative and gram-positive bacteria. However, the activity of these known antibiotics is usually limited to a few pathogenic microorganisms, and work has been continued in this field in an attempt to find other antibiotics which would be effective against other pathogens.

Although some of these antibiotics have been found to be invaluable in the treatment of various diseases, it is found that certain strains of some pathogens develop a resistance to a particular antibiotic, and as a result, the antibiotic is no longer active against such resistant strains.

Accordingly, the deficiencies of the known antibiotics have stimulated further research to find other antibiotics whinch will be active against a wider range of pathogens as well as resistant strains of particular microorganisms.

SUMMARY OF THE INVENTION

This invention relates to new antibiotic agents and processes of preparing the same. More particularly, it is concerned with a new antibiotic substance, herein called Antibiotic 833A or by its chemical name (—) (cis-1,2-epoxypropyl)-phosphonic acid, salts thereof and with processes for their production.

It is an object of the present invention to provide a new and useful antibiotic which is highly effective in inhibiting the growth of various gram-negative and gram-positive microorgansms. Another object is to provide a process for the preparation of this novel antiobiotic substance by the fermentation of nutrient mediums with suitable strains of heretofore undescribed microorganisms. Other objects will be apparent from the detailed description of this invention hereinafter provided.

The new antibiotic substance of the present invention is formed by growing, under controlled conditions, previously-unknown strains of microorganisms. Thus, the new antibiotic is produced by growing Antiobiotic 833A producing strains of the genus Streptomyces. One such microorganism, which was isolated from soil, has been designated MA–2898 in the culture collection of Merck & Co., Inc., Rahway, N.J. The original isolate of the Antibiotic 833A-producing culture, obtained as a single colony from soil, was plated onto an agar plate of the following composition:

|  | G./liter |
|---|---|
| Yeast extract | 10 |
| Glucose | 10 |
| Agar | 20 |
| $MgSO_4 \cdot 7H_2O$ | 0.05 |
| Phospate buffer,[1] 2 ml. |  |
| Distilled water q.s., balance. |  |

[1] 91 g. $KH_2PO_4$ and 95.0 g. $Na_2HPO_4$ made up to 1 liter with distilled water.

After several days of growth, it was found that several colony types were produced on the agar plate, namely, both white and pink sporulating types. Single colony sub-isolates were found to vary significantly in pigmentation, aerial mycelium, extent of sporulation, and fermentation of carbohydrates. However, each of the isolates or variants produced (—) (cis-1,2-epoxypropyl)-phosphonic acid. Subisolatess of the parent microorganism are identified as MA–2911, MA–2912, and MA–2913 in the previously-mentioned Merck culture collection. The parent culture was also found to degrade to a non-sporulating form with significant frequency, which does not produce the new antibiotic of this invention.

The parent culture, MA–2898, and the subisolates MA–2911, MA–2912, and MA–2913 have been deposited in the culture collection of the American Type Culture Collection where they are available as ATCC 21096, ATCC 21097, ATCC 21098, and ATCC 21099, respectively. The same cultures have also been placed on permanent deposit with the culture collection of the Northern Utilization Research and Development Branch of the U.S. Department of Agriculture at Peoria, Ill., and have been assigned the culture numbers NRRL B–3357, NRRL B–3358, NRRL B–3359, and NRRL B–3360, respectively.

Based upon extensive taxonomic studies, these microorganisms have been classified in the species *Streptomyces fradiae*. It is a unique strain of the species, differing in one or more characteristics, from all descriptions of members of the species found in standard reference works.

For the taxonomic studies, the parent culture and the single colony isolates were stabilized by the process of lyophilization of spore stocks to insure reproducible results. Cultures used for examination of morphological and physiological characteristics were grown from these stable stocks. Certain of the single colony isolates differed sufficiently from the standard description of *S. fradiae* to the extent that, standing alone, they might be considered as new species. The fact that all single colony isolates originated from a single stock and the fact that the parent culture shows a high order of variability justified including the culture and its variants in the widest scope of their characteristics, as strains of *S. fradiae*. Waksman has defined *S. fradiae* broadly (The Actinomycetes, volume II, p. 212) as follows: "The characteristics of the species are that it is non-chromogenic, strongly proteolytic, and produces the characteristic seashell pink aerial mycelium on various synthetic media; on organic media, orange color growth is produced without any aerial mycelium." The above-mentioned strains of the microorganism producing Antibiotic 833A fit this general description with the exception that the aerial mycelium is often observed on organic media.

The characteristics of the parent isolate and of four single colony isolates are shown in Table 1 in comparison with the description of the type species *Streptomyces fradiae* as it appears in Bergey's Manual of Determinative Bacteriology, 7th edition, pp. 799–800. All of the readings shown in the table were taken after three weeks incubation at 28° C. unless noted otherwise. The pH of the media used in these studies was approximately neutral, namely, pH 6.8–7.2. The colors used in the description are in accordance with the definitions of the Color Harmony Manual, 4th edition, 1958.

TABLE 1

[Characteristics of antibiotic 833A producing strains and *Streptomyces fradiae*]

|  | Original Culture MA-2898 (ATCC 21096) | Single-colony isolates derived from culture MA-2898 | | | *Streptomyces fradiae* |
|---|---|---|---|---|---|
|  |  | MA-2911 (ATCC 21097) | MA-2912 (ATCC 21098) | MA-2913 (ATCC 21099) |  |
| Morphology (applies to all four MA numbers). | Sporophores are long, branched, straight or flexuous. Spores are oval to rod-shaped, 0.9 by 1.2-1.7 microns, in chains of more than 10. (970X) 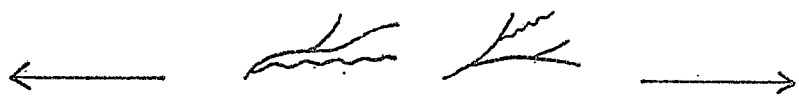 Observed on tomato paste-oatmeal agar, glycerol-asparaginase agar, egg albumen agar, and Czapek-Dox agar. | | | | |
| Aerial mycelium | | | | | Straight, branching filaments and hyphae. No spirals. Conidia rod-shaped or ellipsoidal, 0.5 by 0.7-1.25 microns. |
| Tomato paste-oatmeal agar. | Reverse—orange. Aerial mycelium—flat, powdery, mixture of pink and cream (4 ca). Spreading fan-shaped areas of cream to tan vegetative growth with no aerial mycelium extending from main mass of growth. Soluble pigment—tan. | Reverse—orange. Aerial mycelium—flat, powdery, pinkish-cream (3 ca). Soluble pigment—tan. | Reverse—deep orange. Aerial mycelium—flat, powdery cinnamon-pink (approx. 5 gc). Soluble pigment—tan. | Reverse—deep orange. Aerial mycelium—flat, powdery, dusty-pink (approx. 5 ec). Soluble pigment—tan. |  |
| Nutrient agar | Reverse—dark cream to yellow. Aerial mycelium—flat, powdery, pale flesh pink. No soluble pigment. | Reverse—cream. Aerial mycelium—flat, powdery, ivory. No soluble pigment. | Reverse—cream to yellow. Aerial mycelium—flat, powdery, pale flesh pink. No soluble pigment. | Reverse—cream. Vegetative—cream-colored, spreading. Aerial mycelium—moderate, grayish-white. No soluble pigment. |  |
| Agar | | | | | Yellowish growth, becoming orange-yellow, restricted. No soluble pigment. |
| Egg albumen agar | Reverse—white to yellow. Aerial mycelium—flat, powdery, ivory with pink tint, very pale pink along edge of growth. Soluble pigment—faint yellow. | Reverse—white to yellow. Aerial mycelium—flat, powdery, cream shading into very pale pink tint. Soluble pigment—faint yellow. | Reverse—white to yellow. Aerial mycelium—flat, powdery, mottled pink, cream and white (7 ca). Soluble pigment—faint yellow. | Reverse—cream to pinkish yellow. Spreading growth. Aerial mycelium—flat, powdery, cream with definite pink tint. Soluble pigment—faint pinkish-yellow. |  |
| Czapek-Dox agar | Reverse—cream. Aerial mycelium—flat, powdery, ivory with definite pink tint. Soluble pigment—faint yellow. | Reverse—white. Aerial mycelium—flat, powdery, ivory. No soluble pigment. | Reverse cream. Aerial mycelium—flat, powdery, mottled pink, cream and white (7 ca). Soluble pigment—faint yellow. | Moderate growth, flat and colorless with areas of yellow vegetative growth. Aerial mycelium—sparse, whitish. No soluble pigment. |  |
| Glycerol-asparaginase agar. | Reverse—yellow-brown. Aerial mycelium—flat, powdery, very pale, flesh pink. Soluble pigment—tan. | Reverse—orange. Aerial mycelium—flat, grainy, pale beige with white edging. Soluble pigment—tan. | Reverse—orange. Aerial mycelium—flat, powdery, pale rose-beige. Soluble pigment—tan. | Reverse—cream to yellow. Aerial mycelium—moderate, pale cream. Soluble pigment—light pinkish-tan. |  |
| Synthetic agar | | | | | Smooth, spreading colorless growth. Aerial mycelium—thick, cottony mass covering surface, sea-shell pink. |
| Yeast extract—dextrose agar. | Reverse—orange. Aerial mycelium—flat, powdery, pinkish-cream (approx. 3 ca). Spreading fan-shaped areas of cream-colored vegetative growth with no aerial mycelium extending from main mass of growth. Soluble pigment—tan. | Reverse—mottled yellow and brown. Vegetative growth—tan. Aerial mycelium—moderate, white. Soluble pigment—tan. | Reverse—orange. Aerial mycelium—flat, velvety, cream-colored in center of growth streak, pink on sides, and white on edges. Soluble pigment—tan. | Reverse—tan. Aerial mycelium—light growth white in color. Spreading fan-shaped areas of cream-colored vegetative growth with no aerial mycelium extending from main mass of growth. Soluble pigment—light tan. |  |
| Glucose agar | | | | | Growth restricted, glossy, buff-colored, lichenoid margin. |

TABLE 1—Continued

|  | Original Culture MA-2898 (ATCC 21096) | Single-colony isolates derived from culture MA-2898 | | | Streptomyces fradiae |
|---|---|---|---|---|---|
|  |  | MA-2911 (ATCC 21097) | MA-2912 (ATCC 21098) | MA-2913 (ATCC 21099) |  |
| Skim milk | Ring of moderate vegetative growth, yellow. Aerial mycelium— sparse, creamy. Partial peptonization. Soluble pigment— cream to light tan. pH 8.0. | Ring of moderate vegetative growth, yellow. Aerial mycelium— sparse, creamy. Partial peptonization. Soluble pigment— cream to light tan. pH 7.9. | Ring of moderate vegetative growth, yellow. Aerial mycelium— sparse, creamy. Partial peptonization. Soluble pigment— cream to light tan. pH 7.8. | Ring of light vegetative growth creamy. No aerial mycelium. Partial peptonization. Soluble pigment— pinkish cream. pH 7.1. |  |
| Micro-aerophilic growth (yeast extract-dextrose agar stab—45 mm. depth). | Surface growth—good. Depth of growth in stab—5 mm. Aerobic. | Surface growth—good. Depth of growth in stab—5 mm. Aerobic. | Surface growth—good. Depth of growth in stab—5-15 mm. Aerobic. | Surface growth—good. Depth of growth in stab—5-15 mm. Aerobic. | Aerobic. |
| Pigment solubility | The growth is pigmented. In addition, a small amount of non-melanoid soluble pigment is released. On some media, the soluble pigment is limited to the area immediately surrounding growth. Does not have indicator properties. | | | | The pigment formed is not soluble. |

These antibiotic-producing strains were also tested for their ability to utilize or assimilate various carbohydriates. For this purpose, the microorganisms were grown in basal synthetic medium (Pridham and Gottlieb) containing 1% of the carbohydrate at 28° C. for three weeks. Table 2 shows the utilization of these carbohydrate sources by the Antibiotic 833A-producing strains: + indicating good growth, ± poor growth, and — no growth on the particular carbohydrate.

TABLE 2.—CARBOHYDRATE UTILIZATION

[Carbohydrate utilization (Pridham & Gottlieb Basal Synthetic Medium —1% carbohydrate)]

|  | Original Culture MA-2898 (ATCC 21096) | Single-colony isolates derived from culture MA-2988 | | |
|---|---|---|---|---|
|  |  | MA-2911 (ATCC 21097) | MA-2912 (ATCC 21098) | MA-2913 (ATCC 21099) |
| Glucose | + | + | + | + |
| Sucrose | + | + | ± | — |
| Lactose | + | ± | ± | — |
| Xylose | + | + | + | — |
| Maltose | + | + | + | + |
| Arabinose | + | + | + | + |
| Inositol | — | — | — | — |
| Mannose | + | + | + | — |
| Fructose | + | + | + | — |
| Raffinose | — | — | — | — |
| Mannitol | — | — | — | — |
| Rhamnose | + | + | + | — |
| Cellulose | — | ± | — | — |

The characteristics described in the foregoing tables were used in following the keys to the species of Streptomyces published in Bergey's Manual of Determinative Bacteriology, 7th Edition, pages 745–753, and The Actinomycetes, volume II, pages 156–164. Comparison of the detailed characteristics of the culture and its variants shows that the cultures resemble the description of the type culture of *Streptomyces fradiae* in all significant properties. Accordingly, these Antibiotic 833A-producing cultures have been assigned the species designation *Streptomyces fradiae*.

Another species of *Streptomyces fradiae* producing the new antibiotic of this invention which was also isolated from soil is designated as MA-2915 in the culture collection of Merck & Co., Inc., Rahway, N.J. This culture has also been placed on permanent deposit with the culture collection of the Northern Utilization Research and Development Division of the U.S. Department of Agriculture at Peoria, Ill., and has been assigned the culture number NRRL-3417.

The new antibiotic of this invention is also produced by growing, under controlled conditions, other previously-unknown strains of Streptomyces. Thus, other strains of Streptomyces also isolated from soil and identified in the Merck & Co., Inc., culture collection as cultures MA-2867, 2903, 2916, 2917, 3270, 3272 and 3269 produce the new antibiotic of this invention.

The cultural characteristics of strains MA-2867, 2903, 2916, 3270, 2917 and 3272 were found to be very similar. The characteristics of four of these cultures, namely, MA-2916, 2917, 2903, 2867 and 3269 are shown in Table 2.

TABLE 3

[Cultural characteristics of Streptomyces species which produce (−)-(cis-1,2-epoxypropyl)phosphonic acid]

|  | MA-2916 | MA-2917 | MA-2903 | MA-2867 | MA-3269 |
|---|---|---|---|---|---|
| Morphology | Loops and spirals (open and closed); spores oval to spherical—0.9 x 1.2-1.7 μ; in chains of more than 15. | No sporulation found on any medium used; very little visible aerial mycelium. | Hooks, loops and short spirals; spores oval to cylindrical—0.9 x 1.2-1.7 μ; in chains of 10-12. | Loops and spirals (both open and closed); spores 0.9-1.2 x 1.2-1.7 μ; in chains of more than 15. | Sporophores branched, straight, produced in tufts; spores cylindrical—1.2 x 1.7 μ; in chains of more than 10. |
|  | Sporulation seen on tomato paste-oatmeal, glycerol-asparagine, and egg albumin agars. |  | Sporulation seen on tomato paste-oatmeal, glycerol-asparagine, and egg albumin agars. | Sporulation seen on tomato paste-oatmeal, glycerol-asparagine, and egg albumin agars. |  |

 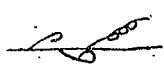  

TABLE 1—Continued

| | Original Culture MA-2898 (ATCC 21096) | Single-colony isolates derived from culture MA-2898 | | | Streptomyces fradiae |
| --- | --- | --- | --- | --- | --- |
| | | MA-2911 (ATCC 21097) | MA-2912 (ATCC 21098) | MA-2913 (ATCC 21099) | |
| Glucose broth | | | | | Dense, narrow, orange-colored ring, abundant, flaky, colorless sediment. |
| Starch agar | Reverse—cream. Aerial mycelium—flat, powdery, very pale flesh pink edged with cream. Soluble pigment—faint yellow. Starch is hydrolyzed. | Reverse—cream. Aerial mycelium—flat, powdery, pale beige edged with cream. Soluble pigment—faint tan. Starch is hydrolyzed. | Reverse—light rose-beige. Aerial mycelium—flat, powdery, pink (6 ca) edged with cream. Soluble pigment—faint rose-beige. Starch is hydrolyzed. | Reverse—cream. Vegetative growth—spreading, almost colorless. Aerial mycelium—moderate, pinkish- Soluble pigment—faint pink. Starch is hydrolyzed. | Spreading, colorless growth. Starch is hydrolyzed. |
| Nutrient starch agar | Vegetative growth—cream. Reverse—yellow. Aerial mycelium—pale flesh pink. Starch is hydrolyzed. | Vegetative growth—cream. Reverse—yellow. Aerial mycelium—cream with pink tint. Starch is hydrolyzed. | Vegetative growth—cream. Reverse—yellow. Aerial mycelium—pink edged with cream. Starch is hydrolyzed. | Vegetative growth—cream, spreading. Reverse—colorless to cream. Aerial mycelium—moderate, creamy white. Starch is hydrolyzed. | |
| Gelatin stab | Cream-colored vegetative growth. No soluble pigment. Gelatin liquefied. | Cream to orange vegetative growth. No soluble pigment. Gelatin liquefied. | Cream-colored vegetative growth. No soluble pigment. Gelatin liquefied. | Cream-colored vegetative growth. No soluble pigment. Gelatin liquefied. | Cream-colored to brownish, dense growth on liquid medium. |
| Nutrient gelatin agar plates. | Vegetative growth—cream. Aerial mycelium—moderate, creamy white. No soluble pigment. Gelatin liquefied. | Vegetative growth—white to cream. Aerial mycelium—moderate, white. No soluble pigment. Gelatin liquefied. | Vegetative growth—white to cream. Aerial mycelium—moderate, white. No soluble pigment. Gelatin liquefied. | Vegetative growth—cream to yellow, spreading. Aerial mycelium—sparse, whitish. No soluble pigment. Gelatin liquefied. | |
| Potato plugs | Vegetative growth—orange, wrinkled. Aerial mycelium—moderate, deep cream, droplets of orange exudate. Moderate darkening of plug. | Vegetative growth—orange, wrinkled. Aerial mycelium—moderate, deep cream. Moderate darkening of plug. | Vegetative growth—orange, wrinkled. Aerial mycelium—deep cream, droplets of orange exudate. Moderate darkening of plug. | Vegetative growth—burnt orange, dry, wrinkled. No aerial mycelium. Moderate darkening of plug. | Restricted, orange-colored growth. |
| Loeffler blood serum. | Vegetative growth—tan. No aerial mycelium. Light tan pigment. Moderate liquefaction. | Vegetative growth—tan. No aerial mycelium. Light tan pigment. Weak liquefaction. | Vegetative growth—tan. No aerial mycelium. Light tan pigment. Weak liquefaction. | Vegetative growth—tan. No aerial mycelium. Light tan pigment. Liquefaction very slight, if any. | |
| Calcium malate agar. | Vegetative growth—colorless. Aerial mycelium—cream with pink tint. No soluble pigment. Clear area surrounding growth. | Vegetative growth—colorless. Aerial mycelium—moderate, cream with pink tint. No soluble pigment. Clear area surrounding growth. | Vegetative growth—cream. Aerial mycelium—very pale flesh pink. No soluble pigment. Clear area surrounding growth. | Vegetative growth—colorless. Aerial mycelium—sparse, creamy. No soluble pigment. Clear area surrounding growth. | |
| Peptone-iron-yeast extract agar. | Vegetative growth—cream. No aerial mycelium. No $H_2S$ production. No soluble pigment. | Vegetative growth—cream. No aerial mycelium. No $H_2S$ production. No soluble pigment. | Vegetative growth—cream. No aerial mycelium. No $H_2S$ production. No soluble pigment. | Vegetative gorwth—cream. No aerial mycelium. No $H_2S$ production. No soluble pigment. | |
| Production of nitrites from nitrates. | Negative | Negative | Negative | Negative | Nitrites not produced from nitrates. |
| Growth at 50° C. (1 week-yeast extract-dextrose agar). | No growth | No growth | No growth | No growth | |
| Tyrosine agar | Vegetative growth—tan with rose tint, moderate. Aerial mycelium—beige, moderate. Soluble pigment—light rosy-brown | Vegetative growth—moderate, tan with rose tint. Aerial mycelium—beige moderate. Soluble pigment—light rosy-brown. | Vegetative growth—moderate, tan with rose tint. Aerial mycelium—light rose-beige. Soluble pigment—rosy-brown. | Vegetative growth—poor, colorless, spreading. Aerial mycelium—very sparse. Soluble pigment—very light rosy-brown. | |
| Skim milk agar | Vegetative growth—tan, smooth, moist-appearing. No aerial mycelium. Soluble pigment—tan. Clear area showing hydrolysis of casein. | Vegetative growth—tan, smooth, moist-appearing. No aerial mycelium. Soluble pigment—tan. Clear area showing hydrolysis of casein. | Vegetative growth—tan, smooth, moist-appearing. No aerial mycelium. Soluble pigment—tan. Clear area showing hydrolysis of casein. | Vegetative growth—tan, smooth, moist-appearing. No aerial mycelium. Soluble pigment—tan. Clear area showing hydrolysis of casein | |
| Litmus milk | Ring of moderate vegetative growth, grayish cream to tan. Aerial mycelium—sparse, whitish. Partial peptonization. pH 8.2. | Ring of moderate vegetative growth, grayish cream to tan. Aerial mycelium—sparse, whitish. Partial peptonization. pH 8.1. | Ring of moderate vegetative growth, grayish cream to tan. Aerial mycelium—sparse, whitish. Partial peptonization. pH 8.1. | Ring of light vegetative growth, cream-colored. No aerial mycelium. Partial peptonization. pH 7.4. | Faint, cream—colored ring; coagulated, peptonized, becoming alkaline. |

TABLE 3—Continued

| | MA-2916 | MA-2917 | MA-2903 | MA-2867 | MA-3269 |
|---|---|---|---|---|---|
| Tomato paste-oatmeal agar. | Vegetative growth—reverse-orange. Aerial mycelium—mixture of white and blue-gray. Soluble pigment—light brown. | Vegetative growth—brown. Aerial mycelium—none. Soluble pigment—tan. | Vegetative growth—brownish orange. Aerial mycelium—cream edged with blue-gray. Soluble pigment—tan. | Vegetative growth—brownish orange. Aerial mycelium—mixture of white and blue-gray (approx. 19fe). Soluble pigment—tan. | Vegetative growth—reverse-brown to tan. Aerial mycelium—grainy, light to dark gray. Soluble pigment—light tan. |
| Glycerol-asparagine agar. | Vegetative growth—reverse-brown. Aerial mycelium—moderate; mixture of white and blue-gray. Soluble pigment—tan. | Vegetative growth—tan. Aerial mycelium—none. Soluble pigment—tan. | Vegetative growth—reddish brown. Aerial mycelium—white mixed with blue-gray. Patches of blue-gray along edge. Soluble pigment—reddish brown. | Vegetative growth—reverse-reddish brown. Aerial mycelium—mixture of white and blue-gray [gray(d)]. Soluble pigment—reddish brown. | Vegetative growth—tan. Aerial mycelium—moderate, light gray. Soluble pigment—light tan. |
| Czapek-Dox agar (sucrose nitrate). | Vegetative growth—reverse-yellow-tan. Aerial mycelium—scant, white along edges. Soluble pigment—tan. | Vegetative growth—tan. Aerial mycelium—none. Soluble pigment—tan. | Vegetative growth—golden yellow. Aerial mycelium—moderate, cream. Soluble pigment—tan. | Vegetative growth—reverse-deep cream. Aerial mycelium—moderate, cream to white. Soluble pigment—tan. | Vegetative growth—thin, colorless. Aerial mycelium—pale gray. Soluble pigment—none. |
| Egg albumin agar. | Vegetative growth—reverse-reddish brown. Aerial mycelium—moderate, white to blue-gray. Soluble pigment—reddish brown. | Vegetative growth—tan. Aerial mycelium—none. Soluble pigment—tan. | Vegetative growth—cream. Aerial mycelium—mixture of white and blue-gray. Areas of blue-gray along edge [gray (e)]. Soluble pigment—none. | Vegetative growth—reverse-pinkish tan. Aerial mycelium—mixture of white and blue-gray. Soluble pigment—pinkish tan. | Vegetative growth—flat, spreading, reverse-grayish. Aerial mycelium—grainy, light to dark gray. Soluble pigment—none. |
| Calcium malate agar. | Vegetative growth—colorless to cream. Aerial mycelium—cottony, bluish-gray and white. Soluble pigment—none. Utilization of malate—partial clearing of area along growth. | Vegetative growth—tan. Aerial mycelium—none. Soluble pigment—none. Utilization of malate—partial clearing of area around growth. | Vegetative growth—tan. Aerial mycelium—brownish white. Soluble pigment—none. Utilization of malate—clear zone around growth. | Vegetative growth—reverse-cream. Aerial mycelium—moderate, blue-gray. Soluble pigment—none. Utilization of malate—clear zone around growth. | Vegetative growth—flat, spreading, colorless. Aerial mycelium—grainy, medium gray. Soluble pigment—none. Utilization of malate—clear zone surrounding growth. |
| Nutrient agar plates. | Vegetative growth—moderate, tan. Aerial mycelium—sparse, whitish. Soluble pigment—none. | Vegetative growth—moderate, tan. Aerial mycelium—none. Soluble pigment—none. | Vegetative growth—spreading, tan. Aerial mycelium—grayish white. Soluble pigment—none. | Vegetative growth—reverse-cream. Aerial mycelium—light gray edged with white. Soluble pigment—slight, brown. | Vegetative growth—tan. Aerial mycelium—grainy, light to medium gray edged with white. Soluble pigment—very light tan. |
| Nutrient tyrosine agar. | Vegetative growth—tan to grayish tan. Aerial mycelium—sparse, brownish. Soluble pigment—grayish tan edging growth. Clear zone around growth. | Vegetative growth—brown. Aerial mycelium—none. Soluble pigment—grayish tan edging growth. Clear zone around growth. | Vegetative growth—tan to grayish tan. Aerial mycelium—grayish cream. Soluble pigment—grayish brown. Clear zone around growth. | Vegetative growth—tan. Aerial mycelium—gray. Soluble pigment—brownish gray edging growth. Clear zone around growth. | Vegetative growth—tan. Aerial mycelium—thin, gray edged with white. Soluble pigment—light tan. Clear zone around growth. |
| Yeast extract-dextrose agar. | Vegetative growth—brown. Aerial mycelium—scant, light gray and white. Soluble pigment—none. | Vegetative growth—brown. Aerial mycelium—none. Soluble pigment—brown. | (Not tested on this medium.) | Vegetative growth—reserve-dark brown. Aerial mycelium—light gray to white. Soluble pigment—brown. | Vegetative growth—light brown. Aerial mycelium—sparse, grayish white. Soluble pigment—light brown. |
| Starch agar (synthetic). | Vegetative growth—reverse-cream to colorless. Aerial mycelium—grayish blue to white. Soluble pigment—slight yellowing of medium. | Vegetative growth—ligyt tan, transparent. Aerial mycelium—none. Soluble pigment—slight browning of medium. | Vegetative growth—colorless. Aerial mycelium—grayish blue. Soluble pigment—slight darkening of medium. | Vegetative growth—reverse-tan. Aerial mycelium—cottony, grayish blue (19dc). Soluble pigment—tan (edging growth). | Vegetative growth—light grayish tan to white. Aerial mycelium—grainy, light to medium gray. Soluble pigment—none. |
| Nutrient gelatin plates. | Vegetative growth—tan, moderate. Aerial mycelium—none. Soluble pigment—tan. Liquefaction—complete. | Vegetative growth—tan. Aerial mycelium—none. Soluble pigment—brown. Liquefaction—complete. | Vegetative growth—tan. Aerial mycelium—sparse, whitish. Soluble pigment—brown. Liquefaction—complete. | Vegetative growth—tan. Aerial mycelium—sparse, grayish white. Soluble pigment—tan. Liquefaction—complete. | Vegetative growth—tan. Aerial mycelium—none. Soluble pigment—very light tan. Liquefaction—good. |
| Gelatin stabs | Vegetative growth—cream, suspended throughout medium. Soluble pigment—greenish brown. Liquefaction—complete. | Vegetative growth—cream, suspended throughout medium. Soluble pigment—greenish brown. Liquefaction—complete. | Vegetative growth—tan flakes at bottom of tube. Soluble pigment—brown. Liquefaction—complete. | Vegetative growth—cream, suspended throughout medium. Soluble pigment—greenish brown. Liquefaction—complete. | Vegetative growth—cream to tan ring, flakes on bottom of of tube. Aerial mycelium—none. Soluble pigment—very light tan. Liquefaction—complete. |
| Nutrient starch agar. | Vegetative growth—tan. Aerial mycelium—grayish white. Soluble pigment—light tan. Hydrolysis—moderate. | Vegetative growth—tan. Aerial mycelium—none. Soluble pigment—light brown. Hydrolysis—moderate. | Vegetative growth—cream; reverse-cream to yellow. Aerial mycelium—moderate, grayish white. Soluble pigment—light brown. Hydrolysis—moderate. | Vegetative growth—tan. Aerial mycelium—grayish white. Soluble pigment—tan edging growth. Hydrolysis—moderate. | Vegetative growth—tan. Aerial mycelium—gray edged with white. Soluble pigment—very light tan. Hydrolysis—moderate. |

TABLE 3—Continued

| | MA-2916 | MA-2917 | MA-2903 | MA-2867 | MA-3269 |
|---|---|---|---|---|---|
| Skim milk agar plates. | Vegetative growth—grayish brown. Aerial mycelium—none. Soluble pigment—reddish brown. Casein hydrolysis—good. | Vegetative growth—brown. Aerial mycelium—none. Soluble pigment—brown. Casein hydrolysis—good. | Vegetative growth—center brown, edges gray. Aerial mycelium—none. Soluble pigment—dark reddish brown. Casein hydrolysis—good. | Vegetative growth—reverse-reddish brown. Aerial mycelium—brown and gray. Soluble pigment—dark reddish brown edging growth. Casein hydrolysis—moderate. | Vegetative growth—tan. Aerial mycelium—grayish white to light gray. Soluble pigment—light tan. Casein hydrolysis—good. |
| Skim milk | Vegetative growth—moderate, brown ring. Aerial mycelium—sparse, whitish. Soluble pigment—cream to brown (layered). Partial peptonization. soft coagulum. pH 6.2. | Vegetative growth—moderate, tan to brown ring. Aerial mycelium—none. Soluble pigment—cream to brown (layered). Partial peptonization. pH 6.3. | Vegetative growth—heavy, brown ring. Aerial mycelium—brownish gray. Soluble pigment—dark brown. Peptonization. pH 6.1. | Vegetative growth—moderate to heavy brown ring. Aerial mycelium—sparse, whitish. Soluble pigment—dark brown. Partial peptonization. pH 6.4. | Vegetative growth—thin growth ring, cream to tan. Aerial mycelium—none. Soluble pigment—tan. Soft coagulum followed by peptonization. pH 7.7. |
| Litmus milk | Vegetative growth—heavy, brown ring. Aerial mycelium—sparse, whitish. Soluble pigment—reddish brown. Peptonization. pH 6.8. | Vegetative growth—moderate, brown partial ring. Aerial mycelium—none. Soluble pigment—reddish brown. Peptonization. pH 6.9. | Vegetative growth—dark brown moderate to heavy ring. Aerial mycelium—grayish white. Soluble pigment—dark brown. Peptonization. pH 6.75. | Vegetative growth—dark brown moderate ring. Soluble pigment—brown. Peptonization. pH 6.8. | Vegetative growth—thin growth ring. Aerial mycelium—none. Soft coagulum followed by peptonization. pH 8.2. |
| Carbohydrate utilization (Pridham & Gottlieb Basal Synthetic Medium—1% carbohydrate) | | | | | |
| No sugar | No growth | No growth | No growth | No growth | Good growth. |
| Glucose | do | do | +(P) | +(P) | Very limited growth or none. |
| Arabinose | +(P) | do | + | +(P) | Do. |
| Cellulose | No growth | do | ± | No growth | Moderate growth. |
| Fructose | +(P) | + | +(P) | +(P) | Very limited growth or none. |
| Inositol | No growth | ±v(Pp) | +(P) | + | Good growth. |
| Lactose | +(P) | +(Pp) | +(P) | +(P) | Do. |
| Maltose | +(P) | +(P) | +(P) | +(P) | Do. |
| Mannose | ±v(P) | + | +(P) | No growth | Very limited growth or none. |
| Mannitol | No growth | No growth | +(P) | do | Moderate growth. |
| Sucrose | +(P) | +(P) | +(P) | +(P) | Good growth. |
| Xylose | +(P) | +(P) | +(P) | + | Very limited growth or none. |
| Raffinose | No growth | + | +(P) | + | Good growth. |
| Rhamnose | +(P) | +(Pp) | +(P) | +(P) | |
| Potato plug | Vegetative growth—gray. Aerial mycelium—none. Soluble pigment—gray-brown. | Vegetative growth—dark tan. Aerial mycelium—none. Soluble pigment—gray-brown. | Vegetative growth—dark tan, heavily wrinkled. Aerial mycelium—light gray to blue-gray. Soluble pigment—brown. | Vegetative growth—grayish tan to gray. Aerial mycelium—none. Soluble pigment—gray. | Vegetative growth—wrinkled, tan. Aerial mycelium—none. Soluble pigment—some browning of plug. |
| Peptone-iron-yeast extract agar. | Vegetative growth—dark gray. Aerial mycelium—none. Soluble pigment—black. | Vegetative growth—dark gray. Aerial mycelium—none. Soluble pigment—black. | Vegetative growth—dark gray to black. Aerial mycelium—none. Soluble pigment—almost black. | Vegetative growth—dark gray. Aerial mycelium—none. Soluble pigment—black. | Vegetative growth—tan. Aerial mycelium—none. Soluble pigment—none. |
| Loeffler's blood serum slants. | Vegetative growth—gray. Aerial mycelium—none. Soluble pigment—dark brown. Liquefaction—good. | Vegetative growth—gray. Aerial mycelium—none. Soluble pigment—dark brown. Liquefaction good. | Vegetative growth—dark gray. Aerial mycelium—none. Soluble pigment—gray to black. Liquefaction—none. | Vegetative growth—gray. Aerial mycelium—none. Soluble pigment—grayish-brown. Liquefaction—none. | |
| Reduction of nitrates (organic medium). | No reduction to nitrites. | No reduction to nitrites. | No reduction to nitrites. | No reduction to nitrites. | Positive. |
| Microaerophilic growth (yeast extract-dextrose agar stab—45 mm. depth). | Good surface growth. Isolated colonies along upper 10 mm. of stab line. | Good surface growth. Isolated colonies along stab line for 15 mm. | Good surface growth and along upper 5 mm. of stab line. | Good surface growth and along upper 5 mm. of stab line. | Good surface growth and along ½ of stab line. |
| Temperature | Good growth at 28° C. No growth at 50° C. | Good growth at 28° C. No growth at 50° C. | Good growth at 28° C. No growth at 50° C. | Good growth at 28° C. No growth at 50° C. | Good growth at 28° C. and 37° C. No growth at 50° C. |

All readings taken after 3 weeks' incubation at 28° C. except where noted. Physiological tests run after 7 days' and after 3 weeks' incubation. Color Harmony Manual, 4th edition, 1958, Container Corporation of America.

(P) = Soluble pigment—light tan.
(Py) = Soluble pigment—yellowish tan.
(Pp) = Soluble pigment—pinkish tan.
v = On triplicate plates had +, ±, −.

Based upon these cultural characteristics, it has been concluded that these cultures should be classified as members of the species *Streptomyces viridochromogenes*, although all of the above-mentioned strains differ from the published type description of *Streptomyces viridochromogenes* in lacking gray to black mycelial coloration when grown on synthetic agar. Since this is the only significant difference, it is not considered to be adequate to justify assigning a new species name to these cultures. The viridochromogenes section of the Streptomycetes includes a group of closely-related cultures. Some authorities apply separate species names, inter alia *S. chartreusis, S. cyaneus,* as well as bicolor, coeruleofuscus, coerulerorubidis, coerulescens and longisporus, which Russian taxonomists place in the Actinomyces, equivalent to the Streptomyces group of other scientists. Cultures MA–2903, 2867, 2916, 2917 and 3270 have been placed on permanent deposit with the culture collection of the Northern Utilization Research and Development Division of the U.S. Department of Agriculture at Peoria, Ill., where they are available as cultures NRRL–3413, 3414, 3415, 3416 and 3427, respectively. Culture MA–2916 has also been deposited in the culture collection of the American Type Culture Collection, which it is available as ATCC–21240.

The characteristics of culture MA–3269 are also shown in Table 2. The culture clearly is a member of the series Cinereus as defined in The Actinomycetes, vol. II, S. A. Waksman. Based on the sporophore morphology, the culture falls within the section Rectus-Flexibilis, as described by Pridham, Hesseltine, and Benedict, in Applied Microbiology 6, 52 (1958). It differs in some aspects from all previously described species of Streptomyces. It is most closely related to *Streptomyces wedmorensis.* A relatively rapid peptonization of milk and the production of a soft coagulum are significant differences but are not considered sufficient to establish a new species. For this reason, the culture has been assigned to the species *S. wedmorensis.* This culture has been deposited in the American Type Culture Collection, where it is available as ATCC–21239 and in the A.R.S. Collection of the Norther Utilization and Research and Development Division of the U.S. Department of Agriculture at Peoria, Ill., where it is available as NRRL–3426.

The above descriptions of the microorganisms producing Antibiotic 833A are given as illustrative of suitable strains of microorganisms, which can be used in the production of the antibiotic, but it is to be understood that the present invention is not to be limited to organisms answering these particular descriptions. The present invention also contemplates the use of other microorganisms including strains of Streptomyces either isolated from nature or obtained by mutation of these organisms such as those obtained by natural selection or those produced by mutating agents, for example, X-ray irradiation, ultraviolet irradiation, nitrogen mustards, and the like.

The new antibiotic of this invention is produced during the aerobic fermentation of suitable aqueous nutrient mediums, under controlled conditions described hereinafter by (—) (cis-1,2-epoxypropyl)-phosphonic acid producing strains of microorganisms. Aqueous mediums, such as those employed for the production of other antibiotics, are suitable for producing this new antibiotic. Such mediums contain sources of carbon and nitrogen assimilable by the microorganism and inorganic salts. In addition, the fermentation mediums contain traces of metals necessary for the growth of the microorganism which are commonly supplied as impurities incidental to the addition of other constituents of the medium.

In general, carbohydrates such as sugars, for example, sucrose, maltose, fructose, lactose, and the like, and starches such as grains, for example, oats and rye, corn starch, cornmeal, and the like, can be used either alone or in combination as sources of assimilable carbon in the nutrient medium. The exact quantity of the carbohydrate source or sources utilized in the medium will depend in part upon the other ingredients of the medium, but it is usually found that an amount of carbohydrate between about 1 and 6% by weight of the medium is satisfactory. These carbon sources can be used individually or several such carbon sources may be combined in the medium.

Satisfactory nitrogen sources include myriad proteinaceous materials such as various forms of hydrolysates of casein, soybean meal, corn steep liquor, distilled solubles, yeast hydrolysates, tomato paste, and the like. The various sources of nitrogen, either alone or in combination, are used in amounts ranging from about 0.2–6% by weight of the aqueous medium. Examples of mediums suitable for the production of (—) (cis-1,2-epoxypropyl)-phosphonic acid are shown in the examples which follow.

The fermentation using the (—) (cis-1,2-epoxypropyl)-phosphonic acid producing microorganisms can be carried out at temperatures ranging from about 25–38° C. For optimum results, it is most convenient to conduct these fermentations at temperatures between 26–30° C. The pH of the nutrient mediums suitable for growing the Streptomyces and producing the antibiotic can vary from about 5.5–7.5.

Although the new antibiotic of this invention is produced by both surface and submerged cultures, it is presently preferred to carry out the fermentation in the submerged state. Small scale fermentations are conveniently carried out by placing suitable quantities of nutrient medium in flasks, sterilizing the flasks and contents by heating to 120° C., inoculating the flasks with either spores or a vegetative cellular growth of a (—) (cis-1,2-epoxypropyl) - phosphonic acid producing strain of Streptomyces, loosely stoppering the necks of the flasks with cotton, and permitting the fermentation to proceed in a constant temperature room at about 28° C. on a shaker for 3–5 days. For larger scale work, it is preferable to conduct the fermentation in suitable tanks provided with an agitator and a means of aerating the fermentation medium. In this method, the nutrient medium is made up in the tank and sterilized by heating at 120° C. After cooling, the sterilized medium is inoculated with a suitable source of vegetative cellular growth of the Streptomyces and the fermentation is permitted to proceed for 2–4 days while agitating and/or aerating the nutrient medium and maintaining the temperature at about 28° C. This method of producing (—) (cis-1,2-epoxypropyl)-phosphonic acid is particularly suited for the preparation of large quantities of the new antibiotic.

In carrying out the production of the antibiotic in the submerged state, a small amount of a suitable anti-foam agent such as soybean oil, castor oil, 1% octadecanol in mineral oil, or a polymerized propylene glycol such as Polyglycol 2,000 can be added to the fermentation broth to control excessive foaming during the fermentation.

Assay (—) (Cis-1,2-epoxypropyl)phosphonic acid is conveniently assayed by a disc-plate procedure using *Proteus vulgaris* MB–838 (ATCC 21100 and NRRL B–3361) as the test organism. The test culture is maintained as a slant culture on nutrient agar (Difco) plus 0.2% yeast extract (Difco). The inoculated slants are incubated at 37° C. for 18–24 hours and stored at refrigerator temperatures for one week, fresh slants being prepared each week.

The inoculum for the assay plates is prepared each day by inoculating a 250 ml. Erlenmeyer flask containing 50 ml. of nutrient broth (Difco) plus 0.2% yeast extract (Difco) with a scraping from the slant. The flask is incubated at 37° C. on a shaking machine for 18–24 hours. The broth culture is then adjusted to 40% transmittance at a wavelength of 660 m$\mu$, using a Bausch & Lomb Spectronic 20 by the addition of 0.2% yeast extract solution to the growth. Uninoculated broth is used as a blank for this determination. 30 ml. of the adjusted broth is used to inoculate 1 liter of medium.

Nutrient agar (Difco) plus 0.2% yeast extract (Difco) is used as the assay medium. This medium is prepared, sterilized by autoclaving, and allowed to cool to 50° C. After the medium is inoculated, 10 ml. is added to sterile petri dishes and the medium is allowed to solidify.

The activity is expressed in terms of units, a unit being defined as the concentration of the antibiotic per ml. which on a ½ inch paper disc will produce a zone diameter of 28 mms. Four concentrations of 833A are employed for the preparation of the standard curve, namely, 0.3, 0.4, 0.6 and 0.8 units per ml.; each concentration being obtained by the dilution in tris(hydroxymethyl)aminomethane buffer adjusted to pH 8.0. Four discs are placed on each of the five plates for the preparation of the standard curve, each plate containing one disc of each of the four concentrations of antibiotic shown above. The plates are incubated for 18 hours at 37° C. and the diameters of the zones of inhibition in mms. are measured. An average zone diameter for each concentration is calculated, from which a standard curve is prepared on semi-log graph paper. The slope of the line obtained is between 4 and 5.

Samples of the antibiotic to be assayed are diluted in 0.05 M buffer at pH 8.0 to an appropriate concentration. Discs are dipped into the test solution and placed on the surface of the assay plate; two discs for each sample are normally placed on one plate opposite to one another. Two discs dipped into 0.4 units per ml. (—) (cis-1,2-epoxypropyl)-phosphonic acid solution are placed on the plate in an alternate position to the sample. The plates are incubated at 37° C. for 18 hours and the zone diameters in mms. are determined. The potency of the sample is determined by means of a nomograph or from the standard curve. 1 mg. of pure (—) (cis-1,2-epoxypropyl)-phosphonic acid contains 357 units.

Properties of (—) (cis-1,2-epoxypropyl)posphonic acid

The new antibiotic of this invention, previously named Antibiotic 833A and also referred to earlier as l-cis-1,2-epoxy-1-propylphosphonic acid, can be represented structurally as follows:

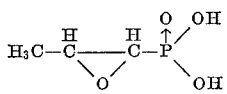

This substance is an acidic compound which is now believed to be more properly named as (—) (cis-1,2-epoxypropyl)phosphonic acid in accordance with present chemical nomenclature practice; the (—) indicating, as does the letter *l*, that this phosphonic acid rotates plane-polarized light in a counterclockwise direction (to the left as viewed by the observer) when the rotation of its disodium salt is measured in water (5% concentration) at 405 mμ. The designation cis used in describing the 1,2-epoxypropylphosphonic acid compound means that the hydrogen atoms attached to carbon atoms 1 and 2 of the propylphosphonic acid are on the same side of the oxide ring.

The structural formula of this antibiotic substance has been shown in the planar formula for the sake of convenience. However, the antibiotic can also be depicted spatially as follows:

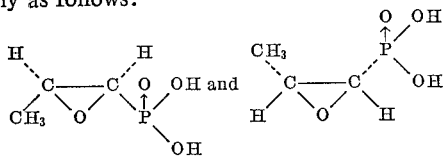

The free acid in crystalline form is a white solid melting at or above about 94° C. when placed in a bath at this or higher temperatures.

The (—) (cis-1,2-epoxypropyl)-phosphonic acid is a water soluble acidic substance which reacts with salt forming substances, such as inorganic and organic bases, to form salts. Thus, upon reaction with alkali metal and alkaline earth metal hydroxides, carbonates, bicarbonates, the corresponding alkali metal or alkaline earth metal salt is obtained. Other metal salts such as silver, iron and the like can be similarly prepared by metathesis or in accordance with other methods well known to those skilled in this art. Similarly, salts of organic bases, such as primary, secondary and tertiary amines, for example, monoalkylamines, dialkylamines, trialkylamines, alkyldiamines, and nitrogen-containing heterocyclic amines, are prepared in accordance with methods known in this art. The salts can be mono salts such as the monosodium salt obtained, for example, by reacting one equivalent of sodium hydroxide with one equivalent of acid; disalts obtained, for example, by reacting two equivalents of sodium hydroxide with one equivalent of the acid; mixed disalts obtained by reacting one equivalent of the monosalt with one equivalent of a second base; diphosphonate salts obtained, for example, by reacting one equivalent of calcium hydroxide with two equivalents of the acid; mixed salts such as calcium hydrogen lactate obtained by reacting one equivalent of lactic acid with the calcium diphosphonate salt and the like.

Representative examples of salts of organic bases that might be mentioned are salts with amines such as α-phenethylamine, diethylamine, quinine, brucine, lysine, protamine, arginine, procaine, ethanolamine, morphine, benzylamine, ethylenediamine, N,N'-dibenzylethylenediamine, diethanolamine, piperazine, dimethylaminoethanol, 2-amino-2-methyl-1-propanol, thiophylline, esters of amino acids, N-methylglucamine and the like. If desired, the basic moiety of the salt can be biologically active amines such as erythromycin, oleandomycin, novobiocin and the like.

The salts of (—) (cis-1,2-epoxypropyl)phosphonic acid which are pharmaceutically acceptable and substantially non-toxic are particularly valuable and can be utilized in preparing suitable dosage-unit pharmaceutical forms. All salts are useful as intermediates in preparing the free acid and for making other salts. The salts of optically-active bases, such as amines, are useful in the separation of optically-active enantiomers of the phosphonic acids.

(—) (Cis-1,2-epoxypropyl)-phosphonic acid is very stable in aqueous solutions to alkaline conditions up to about pH 11 with ammonia or organic amines. Heating aqueous solutions at 100° C. for 15 minutes at a pH of 8–9 does not appear to inactivate the antibiotic. It is unstable below about pH 3. At pH 1.5, the half life at room temperature is less than 24 hours. Instability, even at a higher pH, has been observed in contact with sulfonic or phosphonic ion exchange resins. Incomplete recovery is obtained even with relatively short contact at pH 3 with resins of this type.

The compound is remarkably polar. Based on paper strip studies, the substance is similar to gluconic acid. It is not readily extracted, even in the presence of organic amines, by polar solvents such as phenol. Chromatography on cation exchange resins on the hydrogen cycle also indicates polar properties. Thus, on such resins, the antibiotic is much less retarded than citric acid. The polar nature of the new antibiotic is also indicated by the almost complete lack of adsorption from aqueous solutions by activated carbon at a pH of 5.

The antibiotic is not adsorbed on acidic clays, although alumina, both basic and acid washed, are good adsorbents for the antibiotic. From aqueous solution, the compound is strongly adsorbed at pH 5, but eluted at pH 9. At pH 9, adsorption is strong from 75% methanol-water, but relatively weak in 25% methanol-water. The addition of barium or calcium salts to aqueous solutions does not precipitate the antibiotic. The ammonium salt of the antibiotic appears to have limited solubility in anhydrous methanol, but the sodium salt is soluble in 90% methanol-water.

The antibiotic containing fermentation broths produced in accordance with the procedures described herein have activities ranging from about 1–20 units per ml. when assayed in accordance with the standard assay using *Proteus vulgaris* described in the specification. The antibiotic can be purified and recovered in a purer form by a number of procedures. One such procedure comprises adsorbing the antibiotic on anion exchange resins, for example, resins composed of quaternary ammonium exchange or polyalkylamine groups attached to a styrenedivinyl-benzene polymer lattice. The adsorbed antibiotic is readily eluted from the resin adsorbate with aqueous or aqueous-alcoholic solutions of salts such as ammonium chloride, sodium chloride, sodium acetate and the like. The eluate so obtained can be further purified, if desired, by other purification procedures. Thus, the eluate can be purified by passing it through a bed of polyacrylamide gel having pore sizes allowing the fractionation of substances having molecular weights between 200 and 2,000. Purification of the antibiotic can also be achieved by passing the impure antibiotic solution through a strongly acidic cation exchange resin composed of nuclear sulfonic acid exchange groups attached to a styrene-divinylbenzene polymer lattice, and developing the resin with water. These purification procedures are described in detail in the pending application of Thomas W. Miller, Ser. No. 699,376, filed Jan. 22, 1968.

Alternatively, the antibiotic can be purified by adsorption on alumina; either basic or acid washed alumina being suitable for this purification. The adsorbed antibiotic can be eluted from the alumina most conveniently by aqueous or aqueous-alcoholic ammonium hydroxide solutions having a pH of about 11.2 and fractionally collecting the eluate. Purification of impure solid fractions containing the ammonium salt of (—) (cis-1,2-epoxypropyl)-phosphonic acid can also be affected by dissolving such material in methanol, adding an equal volume of n-butanol, evaporating off the methanol, filtering off any butanol insoluble material, and recovering a butanol solution containing the ammonium salt of the antibiotic of enhanced purity. The ammonium salt can then be obtained in solid form by evaporating the butanol solution to dryness under reduced pressure. Alternatively, the ammonium salt can be extracted from the butanol solution with water to obtain an aqueous solution of the ammonium salt of (—) (cis-1,2-epoxypropyl)-phosphonic acid. The calcium salt of the antibiotic is produced by adding calcium hydroxide to the aqueous solution of the ammonium salt and warming the resulting solution under reduced pressure. Alternatively, the calcium salt is also obtained by passing a solution of another salt of the antibiotic over a cation exchange resin on the calcium cycle. The calcium salt crystallizes from aqueous solutions having a concentration of 10 mg./ml. upon standing or with agitation. These purification procedures are described in more detail in the pending application of Louis Chaiet, Ser. No. 699,377, filed Jan. 22, 1968.

(—) (Cis-1,2-epoxypropyl)-phosphonic acid and its salts are useful antimicrobial agents, which are active in inhibiting the growth of both gram-positive and gram-negative pathogenic bacteria. This antibiotic and particularly its salts, are active against Bacillus, Escherichia, Staphylococci, Salmonella and Proteus pathogens, and antibiotic-resistant strains thereof. Illustrative of such pathogens are *Bacillus subtilis, Escherichia coli, Salmonella schottmuelleri, Salmonella gallinarum, Salmonella pullorum, Proteus vulgaris, Proteus mirabilis, Proteus morganii, Stahphylococcus aureus* and *Stahpylococcus pyogenes*. Thus, (—) (cis-1,2-epoxypropyl)phosphonic acid and salts thereof can be used as antiseptic agents to remove susceptible organisms from pharmaceutical, dental and medical equipment and other areas subject to infection by such organisms. Similarly, they can be used to separate certain microorganisms from mixtures of microorganisms. Salts of (—) (cis-1,2-epoxypropyl)phosphonic acid are also useful in the treatment of diseases caused by bacterial infections in man and animals and are particularly valuable in this respect, since they are active against resistant strains of pathogens. These salts are especially valuable, since they are effective when given orally, although they can also be administered parenterally.

Since the antibiotic and its salts are very active in inhibiting the growth of various species of Salmonella, it can be used as a disinfectant in washing eggs and areas subject to infection by Salmonella. The salts of (—) (cis-1,2-epoxypropyl)phosphonic acid are also useful as bactericides in various industrial applications, for example, in inhibiting undesirable bacterial growth in the white water in paper mills and in paints such as polyvinyl acetate latex paint.

When (—) (cis-1,2-epoxypropyl)phosphonic acid or its salts are used for combatting bacteria in man or lower animals, they may be administered orally in a dosage unit form such as capsules or tablets, or in a liquid solution or suspension. Alternatively, the antibiotic can be administered parenterally by injection. These formulations can be prepared using suitable diluents, extenders, granulating agents, preservatives, binders, flavoring agents, and coating agents known to those skilled in this art. Representative formulations can be prepared by the following procedures:

| Capsules: | Per capsule, mg. |
|---|---|
| Disodium (—) (cis-1,2-epoxypropyl)phosphonate (anhydrous) (Equivalent to free acid 250 mg.) | 330 |
| Lactose, U.S.P., a sufficient quantity (Fill No. 0 Capsules, approx. 475 mg. each) | |
| Calcium (—) (cis-1,2-epoxypropyl)phosphonate (Equivalent to free acid 250 mg.) | 352.5 |
| Lactose, U.S.P., a sufficient quantity (Fill No. 0 Capsules, approx. 475 mg. each) | |

In each of the above examples the active compound and the diluent are mixed to produce a uniform blend, which is then filled into No. 0 hard gelatin capsules, by hand or on a suitable machine, as required. The mixing and filling is preferably done in an area having a relative humidity less than 40%.

| Tablets: | Per tablet, mg. |
|---|---|
| (1) Disodium (—) (cis-1,2-epoxypropyl)phosphonate (anhydrous) (Equivalent to free acid 250 mg.) | 330 |
| Dicalcium phosphate | 192 |
| Lactose, U.S.P. | 190 |
| Cornstarch | 80 |
| Magnesium stearate | 8 |
| | 800 |
| (2) Calcium (—) (cis-1,2-epoxypropyl)phosphonate (Equivalent to free acid 250 mg.) | 352.5 |
| Dicalcium phosphate | 180.0 |
| Lactose, U.S.P. | 179.5 |
| Cornstarch | 80.0 |
| Magnesium stearate | 8.0 |
| | 800.0 |

In the above examples, the active component is blended with the dicalcium phosphate, lactose and about half of the cornstarch. The mixture is granulated with a 15% cornstarch paste and rough-screened. It is dried at 45° C. and screened again through No. 16 screens. The balance of the cornstarch and the magnesium stearate is added and the mixture is compressed into tablets, approximately ½″ in diameter, each weighing 800 mg.

Alternatively, the active component is blended with the dicalcium phosphate, lactose and one-half the cornstarch. The mixture is "slugged" on a heavy duty press to produce compacted tablet-like masses. These are broken down to a No. 16 mesh granule. The balance of the cornstarch and the magnesium stearate are added and the mixture is compressed into tablets approximately ½″ in diameter, each weighing 800 mg.

| Lyo Form (For Injection): | Per vial, mg. |
|---|---|
| (1) Disodium (—) (cis-1,2-epoxypropyl)phosphonate (anhydrous) (Equivalent to free acid 250 mg.) | 330 |
| Water-for-injection U.S.P. to make 5 ml. | |

(2) Disodium (—) (cis-1,2-epoxypropyl)phos-
phonate (anhydrous) _____ 330
Mannitol _____ 500
Water-for-injection U.S.P. to make 5 ml.

In the above examples, the active component, or the active component and the mannitol, are dissolved in sufficient water-for-injection in the ratio shown. The solution is filtered through Selas candles or Millipore membrane filters to sterilize. The solution is subdivided into sterile vials. The vials and contents are frozen, and the water is aseptically removed by lyophilization. The vials containing the sterile dry solid are aseptically sealed.

To restore for parenteral administration, 5 ml. of sterile water-for-injection is added to the contents of a vial.

| Oral liquid forms | Per 5 ml. | Per 1,000 ml. |
|---|---|---|
| Disodium (—) (cis-1,2-epoxy-propyl)-phosphonate (anhydrous) [1] | 660 mg. | 132.0 gm. |
| Sucrose | | 600.0 gm. |
| Glucose | | 250.0 gm. |
| Citric acid | | 13.0 gm. |
| Sodium benzoate | | 1.0 gm. |
| Concentrated orange oil | | 0.2 ml. |
| Purified water U.S.P. to make | | 1,000.0 ml. |

[1] Equivalent to free acid 500 mg./5 ml.

The sucrose and glucose are dissolved in about 400 ml. of water using heat to aid solution. This solution is cooled and the citric acid and sodium benzoate, followed by the concentrated orange oil added. Bring to about 900 ml. volume with water. Add and dissolve the disodium (—) (cis-1,2-epoxypropyl-phosphonate (anhydrous). Clarify by filtration through a coarse filter.

As an alternate, the formulation can be supplied as a 2 bottle package, one containing disodium (—) (cis-1,2-epoxypropyl)-phosphonate (anhydrous), the other a suitable diluent, to be made extemporaneously into an oral liquid as needed.

Bottle 1: Per 100 ml. size
  Disodium (—) (cis - 1,2 - epoxypropyl)-phosphonate (anhydrous) _____ gm__ 6.60
Bottle 2:
  Glycyrrhize Syrup U.S.P. _____ ml__ 100

At time of use the contents of bottle 2 are transferred to bottle 1 and the contents dissolved. Each 5 ml. of the solution contains 330 mg. of disodium (—) (cis-1,2-epoxypropyl)-phosphonate (anhydrous), equivalent to 250 mg. of the free acid.

The (—) (cis-1,2-epoxypropyl)-phosphonic acid is preferably employed as an antibacterial agent in the form of a salt. Good results are obtained in the treatment and control of bacterial infections in adult humans by administration of from about ¼ to 4 gm./day of (—) (cis-1,2-epoxypropyl)-phosphonic acid equivalent, the actual weight being dependent on the particular salt. When the higher dose levels are used, the salt is chosen so that the cation is not unduly toxic at such levels. It will, of course, be understood that the optimum dose in any given instance will depend upon the type and severity of infection to be treated, and that smaller doses will be employed for pediatric use, all of such adjustments being within the skill of the practitioner in the field.

The (—) (cis-1,2-epoxypropyl)-phosphonic acid compounds of this invention may be administered alone or in combination with other biologically active ingredients and especially with other antibacterial agents such as erythromycin, lincomycin, a penicillin, streptomycin, novobiocin, tylosin, gentamycin, neomycin, colistin, kanamycin, oleandomycin, triacetyl oleandomycin and spiromycin.

The following examples illustrate methods for producing and recovering the antibiotic of this invention.

EXAMPLE 1

To an agar slant culture of *Streptomyces fradiae* ATCC 21096 was added 10 ml. of sterile aqueous 0.9% sodium chloride solution. A cell suspension was prepared by scraping the surface of the growth, and 2 ml. of this suspension was added to a 250 ml. baffled Erlenmeyer flask containing 50 ml. of sterile FA nutrient medium of the following composition:

| | g./liter |
|---|---|
| Yeast extract | 10 |
| Glucose | 10 |
| $MgSO_4 \cdot 7H_2O$ | 0.05 |
| Phosphate buffer,[1] 2 ml. | |
| Water, balance. | |

[1] 91 g. of $KH_2PO_4$ + 95.0 g. of $Na_2HPO_4$ made up to 1 liter in distilled water.

The inoculated flask was incubated at 28° C. for 4 days on a 220 r.p.m. rotary shaker with a 2″ throw.

To each of four 250 ml. baffled Erlenmeyer flasks containing 50 ml. of sterile FD medium, prepared by diluting 20 g. of dry oatmeal and 20 g. of tomato paste to one liter with hot distilled water, was added 1.5 ml. of the vegetative culture prepared as described above. The inoculated flasks were incubated at 28° C. on a rotary shaker operating at 220 r.p.m. with a 2″ throw and one flask removed after one day, one after two days, one after three days, and the remaining flask was removed after four days' incubation. The entire contents of each flask was centrifuged at 5,000 r.p.m. for seven minutes and the broth was decanted from the solids. The supernatant broths were assayed and activity was found in the broth harvested after 4 days of incubation. This broth gave an 11 mm. zone of inhibition in a *Proteus vulgaris* diffusion plate assay.

The presence of (—) (cis-1,2-epoxypropyl)-phosphonic acid in the broth was determined by agar diffusion assays performed with 7 mm. filter paper discs soaked in the broth and set on the surface of assay plates containing 5 ml. of nutrient agar (Difco) plus 0.2% yeast extract (Difco) medium seeded with the bacterial inoculum. The zones of inhibition were measured in mm. after overnight incubation at 25° C. The assays with the broth obtained after incubation for 4 days showed a zone diameter of 11 mm. on the plate seeded with *Proteus vulgaris* MB–838 and 25 mm. on the plate seeded with *Erwina atroseptica* MB–1159.

Paper strip chromatographic mobility was determined by developing strips of Whatman No. 3 filter paper spotted at the origin with the broth obtained after 4 days of incubation and developed with solvent "K" [70% isopropanol and 30% pH 6.0 phosphate buffer (0.01 M), or solvent "C" (2% sodium chloride in 75% aqueous methanol)]. Results were visualized by bioautography on thin nutrient agar plus 0.2% yeast extract medium plates seeded with bacterial inoculum. The mobilities which were recorded as the R.F. of the center of the zone of inhibition observed after overnight incubation were as follows:

| | R.F. in solvent system | |
|---|---|---|
| Bioautographic organism | "K" | "C" |
| *Proteus vulgaris* MB–383 | .36 | .73 |
| *Erwina atroseptica* MB–1159 | .28 | .71 |

The mobility of the antibiotic in the same broth was determined using paper strips spotted with the antibiotic solution soaked with 0.165 M pH 7.0 phosphate buffer and developed in a refrigerated unit for 2½ hours at 600 volts. Results were visualized by bioautography on thin nutrient agar plus 0.2% yeast extract plates and the position of the active material was recorded as the cm. of movement from the point of origin to the center of the inhibition zone. The antibiotic showed a movement of 11.5 cm. under these conditions on a bioautographic plate seeded with *Erwina atroseptica*.

EXAMPLE 2

To 10 ml. of sterile AO medium of the following composition:

| | g./liter |
|---|---|
| Beef extract | 3 |
| Casein hydrolysate | 10.6 |
| Dextrose | 10 |
| Sodium chloride | 5 |
| Distilled water q.s., balance. | | and having a pH of 7.2 before sterilization was added an agar slant culture of *Streptomyces fradiae* MA-2898 (ATCC 21096) on FA agar medium of the following composition:

| | g./liter |
|---|---|
| Agar | 20 |
| Yeast extract | 10 |
| Glucose | 10 |
| $MgSO_4 \cdot 7H_2O$ | 0.05 |
| Phosphate buffer,[1] 2 ml. | |
| Distilled water q.s., balance. | |

[1] 91 g. $KH_2PO_4$ and 95 g. $Na_2HPO_4$ made up to 1 liter with distilled water.

A 250 ml. baffled Erlenmeyer flask containing 50 ml. of sterile AO medium was inoculated with 3 ml. of this cell suspension. The flasks were then shaken on a 220 r.p.m. rotary shaker with a 2" throw at 28° C. for 72 hours. The resulting inoculum was then used to seed each of a series of 2-liter baffled Erlenmeyer flasks containing 350 ml. of sterile FD medium, 10.5 ml. of the vegetative growth being used for each flask. The inoculated flasks were then incubated on a 145 r.p.m. rotary shaker having a 2" throw for 96 hours. The contents of 10 flasks were then combined.

The fermentation broth so obtained and having a pH of 6.6 was filtered with the aid of diatomaceous earth. The filtered broth was found to give a 26 mm. zone of activity when assayed with *Proteus vulgaris* as described above.

The FD medium was prepared by diluting 20.0 g. of dry oatmeal and 20.0 g. of tomato paste to 1 liter with hot distilled water.

EXAMPLE 3

A lyophilized culture of Sterptomyces MA-2898 (ATCC 21096) was used to inoculate 50 ml. of sterile FA medium consisting of the following ingredients:

| | g./liter |
|---|---|
| Yeast extract | 10 |
| Glucose | 10 |
| $MgSO_4 \cdot 7H_2O$ | 0.05 |
| Phosphate buffer,[1] 2 ml. | |
| Distilled water q.s., balance. | |

[1] 91 g. $KH_2PO_4$ and 95.0 g. $Na_2HPO_4$ made up to 1 liter with distilled water.

The inoculated flask was then placed on a 220 r.p.m. rotary shaker with 2" throw and incubated for 48 hours at 28° C. and the resulting fermentation broth used to inoculate a second stage seed tank containing 50 ml. of the same medium in a 250 ml. of baffled Erlenmeyer flask using a 2% inoculum. The second stage seed flasks were also shaken on the rotary shaker at 28° C. for 2 days.

An inoculum of 10.5 ml. of this vegetative growth was then used to inoculate a 2-liter baffled Erlenmeyer flask containing 350 ml. of sterilized medium consisting of the following ingredients:

| | g./liter |
|---|---|
| Dry oatmeal | 20 |
| Tomato paste | 20 |
| Distilled water q.s., balance. | |

These 2-liter flasks were incubated on a 145 r.p.m. rotary shaker with a 2" throw for 72 hours at 28° C. At the end of the incubation period, the contents of 10 such flasks were combined and filtered with the aid of diatomaceous earth to remove the mycelium. The resulting filtered fermentation broth gave an inhibition zone of 29 mm. when assayed versus *Proteus vulgaris* MB-838 by the procedure described above.

EXAMPLE 4

2.6 liters of the filtered fermentation broth prepared as described in Example 2 above and 3 liters of the filtered fermentation broth prepared in Example 3 above were combined and found to give an inhibition zone of 26 mm. when assayed with *Proteus vulgaris* MB-838 as described above. The 5.6 liters of fermentation broth was adjusted to pH 7.0 and passed through a column containing 100 ml. of a strongly basic anion exchange resin composed of quaternary ammonium exchange groups attached to a styrene-divinylbenzene polymer lattice (Dowex 1 x 2) on the chloride cycle at the rate of 10 ml. per minute. The resulting spent broth had no antibiotic activity when assayed with *Proteus vulgaris* as described above.

The resulting resin adsorbate was washed with about 100 ml. of water and then eluted with a 3% solution of ammonium chloride in 90% methanol. The eluate was collected in 50 ml. fractions, which exhibited the following activities by the above-described standard *Proteus vulgaris* assay procedure:

(1) No activity
(2) 26 mm. zone
(3) 28 mm. zone at 1:25 dilution
(4) 26 mm. zone at 1:100 dilution
(5) 35 mm. zone
(6) 22 mm. zone
(7) 18 mm. zone
(8–10) No activities Fraction No. 4, which contained most of the antibiotic, was concentrated under vacuum to remove the methanol and then diluted with water to 50 ml. The aqueous solution of Antibiotic 833A so obtained had a pH of 5.6, a total solids of 37 mg./ml., and gave a 25.5 mm. zone at a dilution of 1:100 when assayed with *Proteus vulgaris* as described above.

Paper strip chromatography of this solution of Antibiotic 833A following the procedures described in Example 1 show the following R.F.'s:

| Bioautographic organism | R.F. in solvent system "K" | "C" |
|---|---|---|
| *Proteus vulgaris* MB-838 | .32 | .78 |
| *Erwina atroseptica* MB-1159 | .35 | .72 |

Paper strip electrophoresis of the same product following the procedure of Example 1 showed the following:

| Bioautographic organism | Movement toward anode, cm. |
|---|---|
| *Proteus vulgaris* MB-838 | 11.8 |
| *Erwina atroseptica* MB-1159 | 10.1 |

EXAMPLE 5

Fractions 3 and 5 of the resin eluate prepared as described in Example 4 were combined and concentrated under vacuum to 50 ml. having a pH of 5.4, a total solids of 72 mg./ml., and giving a 27 mm. zone at a 1:40 dilution with water when tested in accordance with the *Proteus vulgaris* assay.

5 ml. of this aqueous solution of (−) (cis-1,2-epoxypropyl)-phosphonic acid was chromatographed on 35 g. of 100–200 mesh spherical polyacrylamide gel having an operating range of 200–2,000 (Bio-gel P-2). The gel adsorbate was then developed with distilled water at the rate of 25 ml. per hour and 4.6 ml. eluate fractions collected. Fractions Nos. 17–21 showed antibiotic activity when assay by the *Proteus vulgaris* disc assay method and showed a purity of about 3 to 5 times the purity of the starting material.

During the elution with the distilled water, the column was monitored with a differential recording refractometer and salt was found in Fractions 21–24 having a $K_{av}$ of 1.88. The $K_{av}$ of the antibiotic active fractions was found to be 1.56.

EXAMPLE 6

A lyophilized culture of *Streptomyces fradiae* MA–2898 (ATCC 21096) was used to inoculate 50 ml. of sterilized medium having the following composition:

| | g./liter |
|---|---|
| Yeast extract | 10 |
| Glucose | 10 |
| $MgSO_4.7H_2O$ | 0.5 |
| Phosphate buffer,[1] 2 ml. | |
| Distilled water q.s., balance. | |

[1] 91 g. $KH_2PO_4$ and 95.0 g. $Na_2HPO_4$ made up to 1 liter with distilled water.

The inoculated flask was then placed on a 220 r.p.m. rotary shaker with 2″ throw and incubated for 48 hours at 28° C.

An inoculum of 10 ml. of the resulting vegetative growth was then used to inoculate a 2-liter baffled Erlenmeyer flask containing 500 ml. of sterilized medium of the same composition shown above. The inoculated flask was then placed on a 220 r.p.m. rotary shaker and incubated for 48 hours at 28° C.

The resulting fermentation broth was used to inoculate a 50-gallon stainless steel fermenter containing 160 liters of sterile medium of the same composition shown above. The inoculated medium was incubated at 28° C. with agitation while maintaining an airflow of 3 c.f.m. through the fermenting broth. During the fermentation period, small amounts of Polyglycol 2,000 were added to control foaming of the batch.

An inoculum of 25 liters of the resulting fermentation broth was then used to inoculate a 200-gallon stainless steel fermenter containing 510 liters of sterile medium of the following composition:

| | g./liter |
|---|---|
| Rolled oats | 20 |
| Distillers solubles | 10 |
| Soybean meal | 20 |
| Sodium citrate | 2 |
| Sodium ascorbate | 0.5 |
| Distilled water q.s., balance. | |

The pH of this medium was adjusted to 6.5 before sterilization. The inoculated broth was then incubated at a temperature of 28° C. with agitation while maintaining an airflow of 10 c.f.m. for 3 days. During the fermentation, Polyglycol 2,000, an antifoam agent, was added in small quantities to prevent excessive foaming of the fermentation broth. The fermentation broth was then filtered with the aid of diatomaceous earth. The filtered broth had a pH of 7.9 and contained 13.4 mg./ml. of total solids. Assay of the filtered broth by the *Proteus vulgaris* disc plate assay procedure showed the broth to contain 0.8 units/ml. of (−) (cis-1,2-epoxypropyl)-phosphonic acid to an activity of the broth solids of 0.06 units/mg.

100 gallons of the filtered broth was adjusted to pH 7 and passed through a column containing a strongly basic anion exchange resin of the quaternary ammonium type having a styrene-divinylbenzene matrix (Dowex 1 x 2). The resulting resin adsorbate was eluted with a 3% solution of ammonium chloride in 90% methanol and the eluate collected in 2-gallon fractions. Fractions 4, 5 and 6, which contained most of the antibiotic, had the following analysis:

| Fraction Number | Total solids, mg./ml | Assay, units/ml | Potency, units/mg. |
|---|---|---|---|
| 4 | 15.1 | 14 | .93 |
| 5 | 21.7 | 14 | .65 |
| 6 | 36.2 | 4 | .11 |

Fractions 4 and 5 were concentrated separately under reduced pressure to remove methanol to a concentration of about 200 mg./ml. of total solids. 275 ml. of the concentrate of fraction 5 containing a total of about 51 g. of solids was passed through 8.9 liters of sperical polyacrylamide gel of 50–100 mesh allowing the fractionation, desalting, and concentration of substances with molecular weights from 200–2,000 (available under the trade name Bio-gel P–2 from Bio-Rad Laboratories, Richmond, Calif.). The resulting gel adsorbate was developed with water at the rate of 50 ml. per minute while the eluate was monitored with a refractometer. The eluate was recovered in fractions, assayed, and the appropriate active fractions combined. The 635 ml. of eluate between 5,600 ml. and 6,230 ml. was found to contain 19.1 mg./ml. of total solids and had an activity of 68 units/ml. when assayed by the above-described *Proteus vulgaris* disc assay procedure. This represented (−) (cis-1,2-epoxypropyl)-phosphonic acid having a potency of 3.6 units/mg.

Four additional chromatograms were carried out in this same way using, respectively, 275 ml. and 287 ml. portions of the concentrate of fraction 5 and two 285 ml. portions of the concentrate of fraction 4. The rich fractions from all five of the chromatograms were pooled and concentrated under reduced pressure to about 100 mg./ml. The 660 ml. of the resulting concentrate had potency of 4.1 units/mg.

100 ml. of this concentrate was passed through a column containing 2,480 ml. of strongly acidic cation exchange resin of the sulfonate type having a styrene-divinylbenzene matrix (sold by the Dow Chemical Company under the trade name Dowex 50 x 2) on the hydrogen form. The resulting resin adsorbate was developed with water at the rate of 19 ml. per minute and 20.5 ml. fractions of the resulting eluate collected, the eluate being monitored by a recording refractometer. Fractions 45–65 were titrated separately to pH 7 with 0.1 N sodium hydroxide. Fractions 52–62 were then assayed and pooled to obtain an aqueous solution of the antibiotic.

In the same way, five additional 100 ml. portions of the concentrate were chromatographed on the strongly acidic cation exchange resin and the most active fractions of the resulting resin eluates were combined with fractions 52–62 to obtain a total of 1,870 ml. This aqueous solution of (−) (cis-1,2-epoxypropyl)-phosphonic acid had a pH of 6.8, a total solids content of 2.9 mg./ml. and assayed at 70 units/ml. Thus, the potency of the sodium salt of the antibiotic in this aqueous solution was 24 units/mg. The aqueous solution was then concentrated under reduced pressure and freeze-dried to obtain 4.7 g. of product.

The dried product so obtained exhibited the following antibacterial and cross-resistance spectrums:

Antibacterial spectrum

Test Organism: Inhibition zone diameter, mm.[1]
- *Escherichia coli* MB–60 _____ 25
- *Bacillus* sp. MB–833 _____ 7
- *Proteus vulgaris* MB–1012 _____ 42
- *Pseudomonas aeruginosa* MB–979 _____ 7
- *Serratia marcescens* MB–252 _____ 15
- *Staphylococcus aureus* MB–108 _____ 17
- *Bacillus subtilis* MB–965 _____ 29
- *Sarcina lutea* MB–1101 _____ 20

*Staphylococcus aureus* MB–698 (streptothricin-resistant) — 29
*Streptococcus faecalis* MB–753 — 12
*Alcaligenes faecalis* MB–10 — 13
*Brucella bronchiseptica* MB–965 — 7
*Salmonella gallinarum* MB–1287 — 35
*Vibrio percolans* MB–1272 — 34
*Xanthomonas vesicatoria* MB–815 — 7

[1] (Disc=7 mm.) 4 mg./ml.

Cross-resistance spectrum

Test Organism [2]     Inhibition zone diameter mm.[1]

[1] (disc=7 mm.) 4 mg./ml.

*Escherichia coli* MB–60 (sensitive parent) — 25
Streptomycin resistant strain — 23
Streptothricin resistant strain — 18
Oxamycin resistant strain — 18
Pleocidin resistant strain — 39
Chloramphenicol resistant strain — 12
Chlortetracycline resistant strain — 17
Oxytetracycline resistant strain — 7
Neomycin resistant strain — 45
Tetracycline resistant strain — 33
Viomycin resistant strain — 17
Polymyxin resistant strain — 15
Grisein resistant strain — 24

[1] (Disc=7 mm.) 4 mg./ml.
[2] Tests performed versus a series of antibiotic-resistant *E. coli* strains isolated by exposure of the parent (MB–60) strain to inhibitory concentrations of antibiotic.

In addition to the pattern of sensitivity in the bacterial spectrum and cross-resistance assays shown above, the effect of the addition of various materials to the medium of the *E. coli* control plate, which affects the activity of various antibiotics differently as revealed by a change in zone size, was studied. The results of these tests are shown in the following table:

SPECIAL EFFECTS SPECTRUM

| Test Assay | Additive | Inhibition zone diameter, mm. (disc=7 mm.) 4 mg./ml. |
|---|---|---|
| *Escherichia coli* MB–60. | None—control | 25 |
| Do | Dowex—soluble resin ET 91 | 24 |
| Do | 0.1 M phosphate buffer, pH 5 | 9 |
| Do | 0.1 M phosphate buffer, pH 7 | 7 |
| Do | 0.1 M phosphate buffer, pH 9 | 7 |

Paper strip chromatography on Whatman 3 mm. filter paper dried after saturation with 0.033 M pH 7.0 phosphate buffer and developed with n-butanol saturated with 0.033 M pH 7.0 phosphate buffer revealed the antibiotic to be a water-soluble compound RF=O. Paper strip electrophoresis developed for 2½ hours at 600 volts with 0.165 M pH 7.0 phosphate buffer in a refrigerated apparatus revealed an unusually mobile acidic spot 11.5 cm. from origin. The presence of the activity was visualized for both the paper strip chromatography and the paper strip electrophoresis by bioautography on agar plates seeded with *Escherichia coli* MB–60.

In summary, (−) (cis-1,2-epoxypropyl) - phosphonic acid was shown to be a water soluble, electrophoretically mobile acidic substance with a novel antibacterial spectrum and cross-resistance pattern.

To determine the in vivo efficacy of the antibiotic, mice were infected by the intraperitoneal route and treated with graded doses of the solid containing the sodium salt of the antibiotic prepared as described above both at the time of infection and again six hours later. Therapy was given by either the intraperitoneal or the oral route. At the completion of the test period, usually seven days after infection, the amount of antibiotic required to protect 50% of the mice ($ED_{50}$) from this otherwise fatal infection was calculated. Uninfected mice also were treated on the same time schedule to determine whether the antibiotic was lethal (toxic) to the test animals.

Oral to intraperitoneal therapy ratio shown in mice by sodium (−) (cis-1,2-epoxypropyl)-phosphonate against three different infecting organisms

| Test organism | $ED_{50}$ mg./mouse/dose* for | | | | p.o./i.p. ratio for | |
|---|---|---|---|---|---|---|
| | Sodium salt | | Tetracycline | | Sodium salt | Tetracycline |
| | (i.p.) | (p.o.) | (i.p.) | (p.o.) | | |
| *Salmonella schottmuelleri* 3010 | .009 | .041 | .024 | .756 | 5 | 31 |
| *Salmonella schottmuelleri* 1814 | .026 | .190 | .026 | .581 | 8 | 22 |
| *Staphylococcus aureus* 2949 | .312 | 1.18 | .006 | .187 | 4 | 31 |

*Therapy given by the indicated route at the time of infection and again at 6 hours after infection. Each figure represents one test only.

The following test results show the intraperitoneal end points of the same preparation of (−) (cis-1,2-epoxypropyl)-phosphonic acid in comparison with tetracycline.

Intraperitoneal endpoints of the sodium salt of (−) (cis-1,2-epoxypropyl) phosphonic acid and of tetracycline in the mouse test. (Each figure represents one test only).

| Infecting organism | i.p. $ED_{50}$ in mg./dose, 2 dose test | |
|---|---|---|
| | Sodium salt | Tetracycline |
| *Salmonella schottmuelleri* 3010 | .010 | .020 |
| | .017 | .007 |
| | .009 | .024 |
| | .017 | .013 |
| *Salmonella schottmuelleri* 1814 | .027 | .026 |
| *Salmonella gallinarum* 3069 | .377 | .055 |
| *Salmonella pullorum* 3198 | .625 | .108 |
| *Salmonella typhimurium* 2637 | 3.57 | >.200 |
| *Escherichia coli* MB–1939 | .294 | .059 |
| *Escherichia coli* MB–2017 | .331 | <.008 |
| *Klebsiella pneumoniae* 3068 | 4.27 | .100 |
| *Klebsiella pneumoniae* B | 4.27 | .016 |
| *Proteus mirabilis* 3201 | .156 | .068 |
| *Proteus morganii* 3202 | .937 | .031 |
| *Proteus vulgaris* 1810 | 3.57 | .188 |
| *Pseudomonas aeruginosa* 2616 | >5.0 | .201 |
| *Pseudomonas aeruginosa* 3210 | >5.0 | .267 |
| *Diplococcus pneumoniae* I 37 | >5.0*(p) | .103 |
| *Staphylococcus aureus* 2949 | .312 | .006 |
| *Streptococcus pyogenes* 3009 | 4.27 | .011 |
| *Staphylococcus aureus* 2957** | .302 | .002 |

*Prolongation of survival time p=.025.
**Resistant to penicillin.

EXAMPLE 7

500 ml. of a vegetative culture of *Streptomyces fradiae* MA–2898 (ATCC 21096) prepared by growing the microorganism in a 2-liter baffled Erlenmeyer flask following the procedure described in Example 6 was used to inoculate a 200-gallon stainless steel fermenter containing 467 liters of sterile medium of the following composition:

g./liter
Yeast extract — 10
Glucose — 10
$MgSO_4 \cdot 7H_2O$ — 0.05
Phosphate buffer [1] — ml — 2
Distilled water q.s., balance.

[1] 91 g. $KH_2PO_4$ and 95.0 g. $Na_2HPO_4$ made up to 1 liter with distilled water.

The inoculated medium was incubated at 28° C. for 24 hours with mechanical agitation while maintaining an airflow of 10 c.f.m. through the fermenting medium; a small quantity of Polyglycol 2,000 being added to control foaming. 215 liters of the resulting fermentation broth was used to inoculate a 1500-gallon stainless steel fermenter containing 1,200 gallons of sterile nutrient medium having the following composition:

g./liter
Rolled oats — 20
Distillers solubles — 10
Soybean meal — 20
Sodium citrate — 2
Sodium ascorbate — 0.5
Distilled water q.s., balance.

the medium being adjusted to pH 6.5 prior to sterilization.

The incoulated broth was incubated at a temperature of 28° C. with agitation while maintaining an airflow at 55 c.f.m. for 2 days, Polyglycol 2,000 being added in small amounts to control the foaming.

The resulting fermentation broth was filtered with the aid of diatomaceous earth. 550 gallons of the filtered broth having an actvitiy of 0.34 units/ml. was passed through a column of previously-used anion exchange resin of the quaternary ammonium type on a styrene-divinylbenzene matrix (Dowex 1 x 2) on the chloride cycle. The resulting resin adsorbate was eluted with a 3% aqueous solution of sodium chloride and the resulting eluate collected in 5-gallon fractions. The spent broth, after passing through the column, was inactive as determined by assay with *Proteus vulgaris*. Fractions 5–12, which contained most of the antibiotic activity, was combined.

An additional 550 gallons of the filtered fermentation broth was passed through a column containing 40 gallons of new anion exchange resin of the same type described above and the resulting resin adsorbate was eluted with a 3% aqueous solution of sodium chloride, the eluate being collected in 5-gallon fractions. Fractions 2–11, containing most of the antibiotic activity, were combined with fractions 5–12 from the first chromatography and concentrated to about 7 gallons under diminished pressure. The resulting concentrate had a pH of 8.5 and a potency of 0.2 units/mg. as determined by the standard *Proteus vulgaris* assay procedure described above.

This resin eluate concentrate was also assayed by a modified assay procedure using *Proteus vulgaris* as the assay organism. In this modified procedure, 5 ml. of inoculated medium is used in the petri dish and the antibiotic to be assayed is placed on a one-half inch paper disc. The dish with the test discs is then incubated for 18 hours at 37° C. and the zones of inhibition are measured. The potency is expressed as the quantity of solid per ml. producing a 25 mm. zone of inhibition under these conditions. The resin eluate (25.85 liters) was found to contain 10.4 kg. of solids and gave a 25 mm. inhibition zone at a concentration of 2.7 mg./ml.

To this 25.85 liters of eluate concentrate was added 15 kg. of acid-washed alumina and the mixture stirred for 30 minutes at a pH of 5.7. The mixture was then filtered and the filtrate was found to contain 9.5 kg. of solids and to give a 25 mm. zone of inhibition at a concentration of 6.1 mg./ml. using the above-described modified assay procedure. The Antibiotic 833A adsorbed on the alumina was eluted with 25 liters of water; the alumina slurry being adjusted to pH 11.1 by the addition of concentrated ammonium hydroxide. After 40 minutes of stirring, the alumina was filtered and the resulting eluate concentrated under reduced pressure to one liter. This concentrate contained 361 g. of solids and gave a 25 mm. zone of inhibition at a concentration of 0.17 mg./ml.

To 850 ml. of this rich concentrate was added 7,650 ml. of metahanol and the insolubles removed by filtration. The filtrate, which contained practically all of the antibiotic, was passed through a column containing one kg. of acid-washed alumina. A methanol gradient containing 2 N ammonia in 75%, 55% and 25% methanol, and finally 2 N aqueous ammonia, was then used to elute the alumina adsorbate; 4,000 ml. of each of the methanol concentrations and the same volume of aqueous ammonia being used for the elution. The eluate from the elution with 2 N ammonia-75% methanol was collected in 4 one-liter fractions and assayed. The assays indicated that these fractions contained insignificant activity and they were therefore discarded.

The eluate from the elution with the 2 N ammonia-50% methanol was likewise collected in four fractions of 1 liter each. The solid content and assay of these fractions were as follows:

| Fraction | Total solids (grams) | Assay (mg./ml. per 25 mm. inhibition zone) |
|---|---|---|
| 1 | 15 | .75 |
| 2 | 31 | .24 |
| 3 | 16 | .13 |
| 4 | 5 | .06 |

The eluate from the eluation with the 2 N ammonia-25% methanol was collected in four fractions of 1 liter each. The solid content and assay of each of these fractions was as follows:

| Fraction | Total solids (grams) | Assay (mg./ml. per 25 mm. inhibition zone) |
|---|---|---|
| 1 | 4.99 | .10 |
| 2 | 8.1 | .04 |
| 3 | 4.4 | .03 |
| 4 | 2.0 | .04 |

The eluate from the elution with the aqueous 2 N ammonia was collected in four fractions of 1 liter each. The first fraction contained a total of 2.9 g. of solids having an assay of 0.12 mg./ml. per 25 mm. inhibition zone, and the second 4.0 g. of solids and an assay of 0.16 mg./ml. per 25 mm. inhibition zone. The remaining two fractions contained only small amounts of antibiotic activity and were discarded.

Each of the eluate fractions obtained as described above was lyophilized. The solids from the last three fractions obtained from the elution with 50% methanol-2 N ammonia were combined and slurried three times with 500 ml. of methanol and then filtered. The methanol extracts were combined and concentrated to 500 ml. under reduced pressure. The resulting concentrate contained 7.5 g. of solids and gave a 25 mm. inhibition zone at a concentration of 0.006 mg./ml.

134 ml. of this concentrate was chromatographed on 100 g. of acid-washed alumina using a continuous (exponential) gradient starting with 2 liters of 75% methanol-2 N ammonia at the rate of 1 ml./minute and continually maintaining the 2 liters of eluting solution at the same volume by adding 2 N aqueous ammonia. The resulting eluate was collected in 20 ml. fractions. The most active fractions 10–25 were combined and concentrated under reduced pressure to 1 ml., which was then dissolved in 12 ml. of methanol and an equal volume of N-butanol added. The methanol was evaporated under reduced pressure. The butanol insoluble material was removed. Assay of the butanol solution of the antibiotic by the modified assay procedure described in this example gave a 25 mm. inhibition zone at a concentration of .005 mg./ml.

EXAMPLE 8

A lyophilized culture of *Streptomyces fradiae* MA-2913 (ATCC 21099) was used to inoculate 50 ml. of sterile medium of the following composition in a 250 ml. baffled Erlenmeyer flask:

|  | g./liter |
|---|---|
| Ground oatmeal | 10 |
| Yeast hydrolysate | 10 |
| Phosphate buffer, [1] 2 ml. |  |
| $MgSO_4 \cdot 7H_2O$ | 0.05 |
| Distilled water q.s., balance. |  |

[1] 91 g. $KH_2PO_4$ and 95.0 g. $Na_2HPO_4$ made up to 1 liter with distilled water.

The inoculated flask was then incubated for 24 hours at 28° C. on a rotary shaker. 10 ml. of the resulting fermentation broth was used to inoculate a second 250 ml. baffled Erlenmeyer flask containing 50 ml. of the same sterile medium. The resulting inoculated broth was incubated at 28° C. on a rotary shaker for 24 hours. The resulting fermentation broth was used to inoculate a 5- aminomethane group with sodium. The sodium salt of (—) (cis-1,2-epoxypropyl-phosphonic acid in the 10 ml. of effluent assayed 480 units/ml. The solution was freeze-dried to afford 71.6 mg. of solid assaying 67 units/mg.

EXAMPLE 12

A 25% methanol-2 N ammonia eluate obtained by the procedure described in Example 7 was freeze-dried to obtain 250 mg. of solids which gave a 25 mm. zone of inhibition at a dilution of 0.028 mg./ml. by the modified *Proteus vulgaris* assay procedure described in Example 7. The dried solid was dissolved in 5 ml. of methanol and 5 ml. of n-butanol added to the methanol solution. The resulting solution was filtered and the filtrate evaporated under reduced pressure to remove the methanol. The butanol solution was filtered to remove insoluble material and the filtrate containing the antibiotic was found to give a 25 mm. zone of inhibition at a dilution of 0.0065 mg./ml.

EXAMPLE 13

The combined 50% and 25% methanol-2 N ammonia eluates, from the alumina chromatography of impure (—) (cis-1,2-epoxypropyl)-phosphonic acid obtained following the procedures described in Example 7, were concentrated under reduced pressure to 500 ml. To this concentrate was added 1,500 ml. of methanol and the resulting solution filtered. The filtrate was evaporated under reduced pressure to obtain an aqueous solution of the antibiotic which, when assayed by the modified assay procedure with *Proteus vulgaris* described in Example 7, gave a 25 mm. zone of inhibition at a dilution of 0.0055 mg./ml.

To 2 ml. of the above concentrate was added 20 ml. of methanol and the resulting solution was filtered. The filtrate was diluted with 60 ml. of n-butanol and the insolubles removed by filtration. The filtrate containing the antibiotic gave a 25 mm. zone of inhibition at a dilution of 0.0025 mg./ml. The filtrate was evaporated to 8 ml. and the insoluble material separated by filtration. The resulting n-butanol solution of the antibiotic gave a 25 mm. zone of inhibition at a dilution of 0.0014 mg./ml. by the modified *Proteus vulgaris* assay procedure.

EXAMPLE 14

To 20 ml. of an aqueous solution of the ammonium salt of (—) (cis-1,2-epoxypropyl)-phosphonic acid containing 1,020 mg. of solids and 204,000 units of activity as determined by the modified *Proteus vulgaris* assay described in Example 7 was added 440 mg. of calcium hydroxide; the resulting solution having a pH of 10.2. The solution was then evaporated to about ½ volume in vacuo with heating, at which point the pH was found to be 7.4. To this concentrate was added about 10 ml. of water and 100 mg. of calcium hydroxide and the resulting mixture again evaporated in vacuo to about ½ volume having a pH of 7.5. This concentrate was diluted with water to about 40 ml. and then filtered. The clear filtrate was evaporated to 15 ml. in vacuo and the concentrate passed over a column of strongly acidic cation exchange resin (Dowex 50) on the calcium cycle. The resin column was developed with water and 10 ml. cuts of the resulting effluent were taken and assayed by means of the modified *Proteus vulgaris* assay. Fractions 3–9, which contained most of the antibiotic activity, were combined and concentrated to about 8 ml. in vacuo with heating. The resulting concentrate was filtered and allowed to crystallize with stirring for about 3 hours. The crystalline calcium salt of (—) (cis-1,2-epoxypropyl)-phosphonic acid was recovered by filtration and washed with water and then methanol before being dried in vacuo. The product so obtained weighed 240 mg. and was found to have an activity of 220 units/mg. when assayed by the modified *Proteus vulgaris* assay procedure. The optical rotation of the product was $[\alpha]_{589}$ —5.7, $[\alpha]_{546}$ —6°, $[\alpha]_{436}$ —12.5, $[\alpha]_{405}$ —14.8°. Elemental analysis after drying at 125° C. for 2 hours in vacuo showed: C, 22.51%; H, 4.2%; and phosphorus, 15.3%.

A small amount of methanol was added to the filtrate and an additional 96 mg. of the crystalline calcium salt was obtained.

The aqueous solution of the ammonium salt of (—) (cis-1,2-epoxypropyl)-phosphonic acid used as the starting material in his example was obtained by extracting an n-butanol solution of the antibiotic obtained following the procedures described in Examples 12 and 13 with 0.3 volume of water and separating the aqueous layers.

EXAMPLE 15

To 10 ml. of an aqueous solution of the ammonium salt of (—) (cis-1,2-epoxypropyl)-phosphonic acid containing 200 mg. of solids and having a total activity of 54,000 units. said solution having been obtained following the procedure described in Example 14, was added 100 mg. of calcium hydroxide and the resulting solution diluted to 20 ml. with water and filtered. The filtrate was concentrated to about 8.5 ml. in vacuo with heating. The resulting concentrate was allowed to stand until the calcium salt of the antibiotic started to crystallize from solution, and the crystallization was allowed to continue with stirring overnight (17 hours). The crystalline product was filtered off, washed with a small amount of 50% aqueous methanol followed by a small amount of methanol, and finally dried in vacuo at room temperature. The calcium salt so obtained weighed 111 mg. and had an activity of 252 units per mg. when assayed by the modified *Proteus vugaris* assay procedure described in Example 7. The elemental analysis of a sample of this calcium (—) (cis-1,2-epoxypropyl)-phosphonate after drying at 125° C. in vacuo (0.6% weight loss) was: C, 21.10%; H, 4.02%; P, 16.75%; and calcium, 21.5%. This crystalline calcium salt was found to have an optical rotation of $[\alpha]_{405}$ —16.2°, $[\alpha]_{436}$ —13.2°, $[\alpha]_{546}$ —7.4°, $[\alpha]_{578}$ —6.8° and $[\alpha]_D$ —6.7° when corrected for the loss in weight on drying.

EXAMPLE 16

To 118 ml. of an aqueous solution of the ammonium (—) (cis-1,2-epoxypropyl)-phosphonate having a solid content of 7.2 mg./ml. and an activity of 250 units/mg. (obtained by the water extraction of a butanol concentrate as described in Example 14) was added 2 grams of benzylamine dissolved in about 5 ml. of ethyl ether. and the resulting solution was concentrated to dryness in vacuo. To the residue was added about 5 ml. of methanol followed by about 5 ml. of benzene and the solution was reconcentrated and dried in vacuo. To the resulting dried partially crystalline product was added 6 ml. of ethanol and 2 ml. of benzene. The solution was then chilled and an additional 10 ml. of benzene was added. Crystals began to form, and a mixture of benzene-ethyl ether (5:1) was added. The crystals were filtered off and washed with 4 ml. of a mixture of benzene-ethyl ether (1:1) to yield 1.082 grams of product containing the monobenzylamine salt (—) (cis-1,2-epoxypropyl)-phosphonic acid having a melting point of 139–142° C. This product was taken up into 40 ml. of hot ethanol, the undissolved material was filtered off, and the resulting filtrate was concentrated to 10 ml. This solution was warmed to redissolve any precipitated material, cooled and then allowed to stand at room temperature for several hours. The crystalline benzylamine salt of (—) (cis-1,2-epoxypropyl)-phosphonic acid which settled out of the solution was filtered, washed with ethanol and dried to afford 0.170 gram of the benzylamine salt having a melting point of 156–160° C. When this product was recrystallized from 2.5 ml. of an ethanol-methanol mixture, 0.15 gram of the benzylamine salt of (—) (cis-1,2-epoxypropyl)-phosphonic acid was obtained having a melting point of 153–158° C. Elementary analysis of the product confirms the empirical formula of $C_{10}H_{16}NPO_4$. Addiliter fermenter containing 2,600 ml. of sterile nutrient medium of the following composition:

| | g./liter |
|---|---|
| Steel cut oats | 30 |
| Corn steep liquor | 10 |
| Soybean meal | 10 |
| Water q.s., balance. | |

The pH was adjusted to 6.6 before sterilization.

The inoculated nutrient broth was then incubated at 28° C. for 4 days while agitating and aerating the fermentation broth with 3 liters of air per minute.

The resulting fermentation broth was then filtered to obtain 2,350 ml. of broth having a pH of 9.0 and an activity of 3.8 units/ml. as determined by the *Proteus vulgaris* disc assay procedure. 750 ml. of the fermentation broth were passed through a column containing 50 ml. of a strongly basic anion exchange resin of the quaternary ammonium type (Dowex 1 x 2) on the chloride cycle. The spent broth from the column contained only a small amount of antibiotic. The resulting resin adsorbate was eluted with a 1% solution of sodium chloride in water and 50 ml. fractions of the resulting eluate collected. The first six eluates contained the following amounts of antibiotic activity:

(1) 5%  (4) 10%
(2) 35%  (5) 6%
(3) 28%  (6) 2%

EXAMPLE 9

A lyophilized culture of *Streptomyces fradiae* MA–2913 (ATCC 21099) was used to inoculate 50 ml. of sterile medium of the following composition in a 250 ml. baffled Erlenmeyer flask:

| | g./liter |
|---|---|
| Ground oatmeal | 10 |
| Yeast hydrolysate | 10 |
| $MgSO_4 \cdot 7H_2O$ | 0.05 |
| Phosphate buffer, [1] 2 ml. | |
| Water q.s., balance. | |

[1] 91 g. $KH_2PO_4$ and 95.0 g. $Na_2HPO_4$ made up to 1 liter with distilled water.

The medium was adjusted to pH 6.5 prior to sterilization.

The inoculated flask was incubated at 28° C. for 24 hours on a rotary shaker. 10 ml. of the resulting broth was used to inoculate a second 250 ml. Erlenmeyer flask containing 50 ml. of the same sterile medium. After incubation at 28° C. for 24 hours on a rotary shaker, the resulting fermentation broth was used to inoculate a 5-liter fermenter containing 3 liters of sterile nutrient broth of the following composition:

| | g./liter |
|---|---|
| Ground oatmeal | 30 |
| Distillers solubles | 10 |
| Soybean meal | 25 |
| Sodium citrate | 4 |
| Sodium ascorbate | 0.5 |
| Water q.s., balance. | |

The medium was adjusted to pH 6.5 before sterilizing.

The inoculated medium was then incubated at 28° C. for 4 days while agitating and aerating the fermentation broth with 3 liters of air per minute; 3 ml. of a propylene glycol polymer having a molecular weight of about 2,000 (sold under the trade name of Polyglycol P-2000 by the Dow Chemical Company) being added to prevent excessive foaming. The resulting fermentation broth had an activity of 5.9 units/ml. as determined by the standard assay using *Proteus vulgaris*.

A second fermentation using this same procedure resulted in a broth having an activity of 6.75 units/ml.

The broths from the two fermentations were combined and filtered. The resulting filtered broth contained 20 mg. of solids per ml. and at a dilution of 1 to 32 gave a 25 mm. zone of inhibition when tested against *Proteus vulgaris* using the modified assay procedure described in Example 7.

96.5 ml. of the broth was stirred for 40 minutes with 2.5 g. of acid-washed alumina. The mixture was then filtered and the filtrate was found to contain 20% of the activity. The filtered alumina adsorbate was washed and eluted with aqueous ammonia at a pH of 11.2. The eluate was evaporated to remove ammonia and was found to give a 25 mm. inhibition zone at a dilution of 0.125 mg./ml. by the modified assay procedure.

EXAMPLE 10

A column of strongly basic anion exchange resin composed of quaternary ammonium exchange groups attached to a styrene-divinylbenzene polymer lattice (Dowex 1 x 2) on the chloride cycle (50–100 mesh) 84.5 cm. x 1.4 cm. was prepared. The resin was washed with 725 ml. of 0.1 M sodium chloride to equilibrate the resin. 36 mg. of crude sodium salt of (−) (cis-1,2-epoxypropyl)-phosphonic acid assaying 27 $\mu$/mg. prepared by the process described in Example 6 was dissolved in one ml. of 0.1 M sodium chloride and applied to the top of the resin bed. The column was then developed with 0.1 M sodium chloride at a rate of one ml./minute collecting five ml. fractions. The effluent stream was monitored using a Mecco-Matic Model 2 refractometer. Every fifth fraction was assayed against *Proteus vulgaris* MB–838 to locate the general area of bioactivity. Two bioactive peaks were observed: fractions 180 to 268 called fraction A–1 and 420 to 560 called fraction A–2. The fractions in each peak were combined and concentrated to 10 ml.

Each concentrate was percolated over a polyacrylamide gel (Bio-Gel P-2) (150 cm. x 1.5 cm.) to separate the antibiotic from the sodium chloride. The effluent was monitored with Mecco-Matic Model 2 refractometer. Fractions were assayed against *Proteus vulgaris* MB–838 to locate bioactivity. Bioactivity between 114 ml. and 250 ml. was pooled, concentrated, and freeze-dried. The A–1 fraction consisting of 1.4 mg. assayed 277 $\mu$/mg. The A–2 fraction consisting of 3.5 mg. assayed 170 $\mu$/mg.

EXAMPLE 11

A column of strongly basic anion exchange resin composed of quaternary ammonium exchange groups attached to a styrene-divinylbenzene polymer lattice (Dower 1 x 2) on the chloride cycle (200–400 mesh) resin 84.5 cm. x 1.4 cm. was prepared. The resin was washed with 800 ml. of tris(hydroxymethyl)aminomethane/HCl pH 8.0 (0.1 MCl$^-$) buffer to equilibrate the resin. Three hundred five and one-half mg. of crude sodium salt of (−) (cis-1,2-epoxypropyl)-phosphonic acid assaying 19 $\mu$/mg. was dissolved in 3 ml. of the same buffer and applied to the top of the resin bed. The column was developed with the same buffer at a rate of 1 ml./minute collecting five ml. fractions. The effluent stream was monitored using a Mecco-Matic Model 2 refractometer. Every fifth fraction was assayed against *Proteus vulgaris* MB–838 to locate the general area of bioactivity. One bioactive peak was observed in fractions 115 to 185. Fractions 164 to 184 were pooled and concentrated to dryness. The residue was dissolved in water (final volume 12.0 ml.) and percolated over a polyacrylamide gel (Bio-Gel P-2) (143 cm. x 4.7 cm.) to separate the antibiotic from the buffer. The effluent was monitored with a Mecco-Matic Model 2 refractometer. Fractions were assayed against *Proteus vulgaris* MB–838 to locate bioactivity. Bioactivity in the fraction between 1,420 ml. and 1,680 ml. was pooled, concentrated, and freeze-dried. The resulting residue consisting of 89.6 mg. assayed 46 $\mu$/mg.

This impure antibiotic was dissolved in 5 ml. of water and the solution passed through a column containing 2 ml. of strongly acidic cation exchange resin composed of nuclear sulfonic acid exchange groups attached to a styrene-divinylbenzene polymer lattice (Dowex 50) on the sodium cycle to replace the tris(hydroxymethyl)

tional monobenzylamine salt was obtained from workup the mother liquors.

EXAMPLE 17

To 40 ml. of a methanol solution containing 60 mg. of ammonium (—) (cis-1,2-epoxypropyl)-phosphonate (obtained by extracting a butanol solution of the salt with water as described in Example 14 and freeze-drying the resulting aqueous extract) was added 48 mg. of d-α-phenylethylamine. The resulting solution was evaporated under a stream of nitrogen and a small volume of methanol was added to the partially crystalline residue. After adding a small volume of acetone followed by a small volume of ether to induce further crystallization of the d-α-phenylethylamine salt of (—) (cis-1,2-epoxypropyl)-phosphonic acid, the crystalline product was filtered off and dried to yield product melting at 139–140° C.

EXAMPLE 18

To 50 ml. of sterile aqueous medium of the following composition:

| | Percent |
|---|---|
| Casein hydrolysate (N-Z amine) | 1 |
| Dextrose | 1 |
| NaCl | 0.5 |
| Meat extract | 0.3 | and having a pH of 7.2 before sterilization was added 1 ml. of an inoculum prepared by suspending an agar slant of *S. viridochromogenes* MA–2867 (NRRL–3414) in 10 ml. of the same medium. The inoculated medium in a 250 ml. baffled Erlenmeyer flask was incubated for 2 days at 28° C. on a rotary shaker and 10 ml. of the resulting fermentation broth was used to inoculate 500 ml. of sterile aqueous medium having the composition shown above in a 2-liter baffled Erlenmeyer flask. This inoculated medium was then grown for 2 days at 28° C. on a rotary shaker and the resulting broth used to inoculate a 50-gallon stainless steel fermentor containing 100 liters of sterile medium of the same composition shown above. This inoculated medium was incubated at 28° C. for 40 hours with agitation while maintaining an airflow of 3 c.f.m. through the fermentation broth. During the fermentation, small amounts of Polyglycol 2000 were added to control the foaming of the fermenting medium.

An inoculum of 43 liters of the resulting fermentation broth was then used to inoculate a 200-gallon stainless steel fermentor containing 510 liters of a sterile aqueous medium containing 2% tomato paste and 2% oatmeal. The inoculated broth was grown at 28° C. for 90 hours with agitation while maintaining an airflow of 10 c.f.m. through the fermenting medium. A filtered sample of the resulting fermentation broth gave a 33 mm. zone of inhibition when assayed using *Proteus vulgaris* MB–838 by the standard procedures described herein.

A portion of this broth was removed from the fermentor after 48 hours and filtered. The filtered broth gave a 25 mm. zone of inhibition when assayed by the standard procedure using *Proteus vulgaris* MB–838. 10.5 liters of the filtered broth was adjusted to pH 8.5 with dilute sodium hydroxide and adsorbed on a column containing 210 ml. of a strongly basic anion exchange resin composed of quaternary ammonium exchange groups attached to a styrene divinylbenzene polymer lattice (Dowex 1 x 2) on the chloride cycle. The resulting resin adsorbate was washed with 300 ml. of water and eluted first with 1 liter of 3% aqueous ammonium bicarbonate solution and then with 1 liter of 3% ammonium bicarbonate in 70% methanol. The eluates were collected in 100 ml. fractions and each of the fractions assayed. The aqueous eluate accounted for 20% of the activity and the methanol eluate accounted for 30% of the activity as determined by the standard assay using *Proteus vulgaris* MB–838. The aqueous eluate fractions were freeze-dried directly while the methanol eluate fractions were concentrated under vacuum and then freeze-dried. The freeze-dried solids were dissolved in water and re-assayed to determine the potency of the various fractions. Solutions of the first two 100 ml. aqueous eluate fractions were combined to produce sample No. 62–2 and solutions of the first three methanol eluate fractions were combined to produce sample No. 62–3. Sample 62–2, having a total volume of 45 ml. and a total solid content of 30 mg./ml., gave a 25 mm. zone of inhibition at 1:200 dilution when assayed by the standard *Proteus vulgaris* assay procedure. Sample 62–3, having a total volume of 27 ml. and a total solid content of 47 mg./ml. gave a 25 mm. zone of inhibition at 1:400 dilution.

Paper strip chromatographic mobilities of (1) a Sample No. 62–2 and (2) Sample No. 62–2 mixed with an equal amount of sodium (—) (cis-1,2-epoxypropyl)-phosphonate were determined by the procedure described in Example 1 with the following results:

| | R.F. in solvent system | |
|---|---|---|
| Biographic organism | "K" | "C" |
| (1) *Proteus vulgaris* MB–838 | 0.42 | 0.79 |
| (2) *Proteus vulgaris* MB–838 | 0.44 | 0.78 |

Paper strip electrophoresis tests also performed side by side with these two samples following the procedures described in Example 1 showed movements of 13.0 cm. for Sample 62–2 and 12.4 cm. for Sample 62–2 plus the sodium salt of (—) (cis-1,2-epoxypropyl)-phosphonic acid.

The Sample 62–2 exhibited the following anti-bacterial and cross-resistance spectrums in tests run simultaneously with calcium (—) (cis-1,2-epoxypropyl)-phosphonate:

| | Inhibition zone diameter, mm. (disc.=7 mm.), calcium (—) (cis-1,2-epoxypropyl)-phosphonate | |
|---|---|---|
| Test organism | 400 μg./ml. | Sample No. 62–2 |
| *Escherichia coli* MB–60 | 26 | 19 |
| *Bacillus sp* MB–833 | 7 | 7 |
| *Proteus vulgaris* MB–1012 | 39 | 36 |
| *Pseudomonas aeruginosa* MB–979 | 8 | 7 |
| *Serratia marcescens* MB–252 | 17 | 13 |
| *Staphylococcus aureus* MB–108 | 18 | 12 |
| *Bacillus subtilis* MB–965 | 36 | 19 |
| *Sarcina lutea* MB–1101 | 25 | 19 |
| *Staphylococcus aureus* MB–608 (Streptothricin-resistant) | 29 | 30 |
| *Streptococcus faecalis* MB–753 | 12 | 7 |
| *Alcaligenes faecalis* MB–10 | 11 | 8 |
| *Brucella bronchiseptica* MB–965 | 7 | 7 |
| *Salmonella gallinarum* MB–1287 | 34 | 28 |
| *Vibrio percolans* MB–1272 | 37 | 32 |
| *Xanthomonas vesicatoria* MB–815 | 15 | 7 |
| *Escherichia coli* MB–60 sensitive parent | 26 | 19 |
| Streptomycin resistant strain | 23 | 18 |
| Streptothricin resistant strain | 21 | 12 |
| Oxamycin resistant strain | 26 | 15 |
| Pleocidin resistant strain | 36 | 36 |
| Chloramphenicol resistant strain | 11 | 9 |
| Chlortetracycline resistant strain | 13 | 13 |
| Oxytetracycline resistant strain | 13 | 7 |
| Neomycin resistant strain | 45 | 49 |
| Tetracycline resistant strain | 31 | 20 |
| Viomycin resistant strain | 15 | 10 |
| Polymyxin resistant strain | 12 | 19 |
| Grisein resistant strain | 23 | 15 |

The results of the foregoing paper strip chromatography, paper strip electrophoresis and the antibacterial and cross-resistance spectrums showed the antibiotic activity in Sample 62–2 to be (—) (cis-1,2-epoxypropyl)-phosphonic acid.

EXAMPLE 19

A lyophilized culture of *S. viridochromogenes* MA–2903 (NRRL–3413) was used to inoculate 50 ml. of a medium having the following composition:

| | g./liter |
|---|---|
| Yeast extract | 10 |
| Glucose | 10 |
| $MgSO_4 \cdot 7H_2O$ | 0.05 |
| Phosphate buffer,[1] 2 ml. | |
| Distilled water q.s., to volume. | |

[1] 91 g. of $KH_2PO_4$ plus 95.0 g. of $Na_2HPO_4$ made up to 1 liter in distilled water.

The inoculated medium in a 250 ml. baffled Erlenmeyer flask was then incubated at 28° C. for 3 days on a rotary shaker. This first generation seed flask was then used to inoculate a series of like flasks for a second generation seed stage, which were shaken for 1 day in the same manner as the first generation flask. The second generation seed stage was used to inoculate (using 2.5% inoculum) a series of ten 2-liter baffled Erlenmeyer flasks, each containing 350 ml. of the following medium:

| | g./liter |
|---|---|
| $K_2HPO_4$ | 0.7 |
| $KH_2PO_4$ | 0.3 |
| Sodium citrate.$2H_2O$ | 0.5 |
| $MgSO_4.7H_2O$ | 0.1 |
| Casamino acid | 2.0 |
| Dextrose (sterilized separately) | 10 |
| Distilled water q.s., to volume. | |

The resulting inoculated flasks were incubated at 28° C. for 5 days on a rotary shaker running at 145 r.p.m. with a 2-inch throw. The resulting broths were pooled, filtered and assayed. The filtered broth had a pH of 7.6 and gave a zone of inhibition of 29 mm. when assayed with *Proteus vulgaris*.

EXAMPLE 20

A lyophilized culture of *S. viridochromogenes* MA–2867 (NRRL–3414) was used to inoculate 50 ml. of a medium having the following composition:

| | Percent |
|---|---|
| Casein hydrolysate (N-Z amine) | 1 |
| Dextrose | 1 |
| NaCl | 0.5 |
| Meat extract | 0.3 |

The inoculated medium in a 250 ml. baffled Erlenmeyer flask was then incubated at 28° C. for 6–7 days on a rotary shaker. The resulting fermentation broth (2.5% inoculum), was used to inoculate ten 2-liter baffled Erlenmeyer flasks, each containing 350 ml. of an aqueous medium of the following composition:

| | G./liter |
|---|---|
| Casein hydrolysate (N-Z amine) | 2.5 |
| Meat extract | 1.0 |
| NaCl | 5.0 |
| Soybean meal | 10 |
| Distillers solubles | 2 |
| Corn steep liquor | 5 |
| Dextrose | 20 |
| $K_2HPO_4$ | 2 |
| $CaCo_3$[1] | 10 |
| Distilled water q.s., to volume. | |

[1] Added after pH medium was adjusted to 7.0 with sodium hydroxide.

The resulting inoculated flasks were incubated for 3 days at 28° C. on a rotary shaker. At this time the fermentation broths were pooled and the filtered broth assayed using *Proteus vulgaris* as the test organism. The final pH of the filtered broth was 6.6 and the broth was found to give a 30 mm. zone of inhibition.

EXAMPLE 21

A lyophilized culture of *S. fradiae* MA–2915 (NRRL–3417) was used to inoculate 50 ml. of the medium described in Example 19. The 250 ml. baffled Erlenmeyer flask containing the inoculated medium was incubated at 28° C. on a rotary shaker for 1 day. The resulting fermentation broth was then used to inoculate a second seed stage using the same procedure as for the first stage. This second stage seed was used, at 2.5%, to inoculate ten 2-liter baffled Erlenmeyer flasks containing 350 ml. of a medium containing 20 g. of dry precooked oatmeal and 20 g. of tomato paste per liter of medium. The inoculated flasks were then incubated at 28° C. for 3 days on a rotary shaker. At this time the broths were cooled and assayed. The filtered broth had a pH of 6.3 and gave a 25 mm. zone of inhibition upon assay with *Proteus vulgaris* using the standard assay procedure.

EXAMPLE 22

A culture slant of *S. viridochromogenes* MA–2916 (NRRL–3415) was used to inoculate 40 ml. of an aqueous medium of the following composition:

| | G./liter |
|---|---|
| Corn starch | 10 |
| Yeast hydrolysate | 10 |
| Phosphate buffer,[1] 2 ml. | |
| Magnesium sulfate | 0.05 |
| Distilled water q.s., to volume. | |

[1] 91 g. of $KH_2PO_4$ plus 95.0 g. of $Na_2HPO_4$ made up to 1 liter in distilled water.

The inoculated medium in a 250 ml. baffled Erlenmeyer flask was incubated at 28° C. on a rotary shaker for 2 days. This seed was used, at 1.5%, to inoculate two 2-liter baffled Erlenmeyer flasks, each containing 350 ml. of the following medium:

| | G./liter |
|---|---|
| Oats | 20 |
| Soybean meal | 15 |
| Sodium citrate.$2H_2O$ | 4.0 |
| Distillers solubles | 5 |
| $CoCl_2.6H_2O$ | 0.1 |
| Distilled water q.s., to volume. | |

The pH of this medium was adjusted to 6.5 and 0.5% of Polyglycol 2000 added to each flask individually. The resulting inoculated flasks were incubated for 4 days at 28° C. on a rotary shaker. The resulting broths were pooled, filtered and assayed. The filtered fermentation broth had a pH of 8.5 and gave a 34.5 mm. zone of inhibition upon assay with *Proteus vulgaris* by the standard assay procedure.

EXAMPLE 23

A culture slant of *S. viridochromogenes* MA–2917 (NRRL–3416) was used to inoculate 40 ml. of a medium of the following composition:

| | G./liter |
|---|---|
| Corn starch | 10 |
| Yeast hydrolysate | 10 |
| Phosphate buffer,[1] 2 ml. | |
| $MgSO_4$ | 0.05 |
| Distilled water q.s., to volume. | |

[1] 91 g. of $KH_2PO_4$ plus 95.0 g. of $Na_2HPO_4$ made up to 1 liter in distilled water.

The inoculated medium was incubated in a 250 ml. baffled Erlenmeyer flask at 28° C. on a rotary shaker. The resulting fermentation broth was used, at 3%, to inoculate 22 250 ml. baffled Erlenmeyer flasks, each containing 30 ml. of the following medium:

| | G./liter |
|---|---|
| Oats | 20 |
| Soybean meal | 15 |
| Sodium citrate.$2H_2O$ | 4 |
| Distillers solubles | 5 |
| $CoCl_2.6H_2O$ | 0.1 |
| Distilled water q.s., to volume. | |

The pH of the medium was adjusted to 6.5 and 0.5% of Polyglycol 2000 was added. The inoculated flasks were grown at 28° C. for 4 days on a rotary shaker. The broths were then pooled, filtered and assayed. The filtered broth had a pH of 9.3 and gave a 25 mm. zone of inhibition upon assay at 1:8 dilution by the standard *Proteus vulgaris* assay.

EXAMPLE 24

A lyophilized culture of *Streptomyces wedmorensis* MA–3269 (NRRL–3426) was used to inoculate 50 ml. of sterile yeast extract-glucose medium of the composition shown in Example 19 in a 250 ml. baffled Erlenmeyer flask. This negative inoculum was developed by incubation for 3 days at 28° C. on a rotary shaker at 220 r.p.m. The resulting inoculum was used to inoculate 50 ml. of sterile casein hydrolysate-meat extract medium of the composition shown in Example 20 in 250 ml. Erlenmeyer flasks using a 3% (1.5 ml./flask) inoculum. The inoculated flasks were grown for 4 days at 28° C. on a rotary shaker at 220 r.p.m. The resulting broth was centrifuged and the clarified broth was found to give a 25 mm. zone of inhibition with 7 mm. paper discs when assayed by the standard procedure using *Proteus vulgaris* MB–838 as the test organism.

Additional assays on this broth using this same disc agar diffusion procedure run at 25° C. and 37° C. for 20 hours showed zones of inhibition of 7 mm. (the zone of the disc) and 26 mm. respectively. This difference in the zones of inhibition at the two temperatures is characteristics of (−) (cis-1,2-epoxypropyl)-phosphonic acid activity.

The paper strip chromatographic mobilities determined on the clarified broth following the procedures described in Example 1 using *Proteus vulgaris* MB–838 as the biographic organism showed an R.F. of 0.25 in solvent system "K" and 0.75 in solvent system "C."

EXAMPLE 25

To 50 ml. of sterile yeast extract-glucose medium of the composition shown in Example 19 in a 250 ml. Erlenmeyer flask was added 1 ml. of an inoculum prepared by suspending an agar slant of *Streptomyces wedmorensis* MA–3269 (NRRL–3426) in 10 ml. of the same medium The inoculated flask was incubated for 2 days at 28° C. The resulting broth was used to inoculate 50 ml. of sterile casein hydrolysate-meat extract medium of the composition shown in Example 20 in 250 ml. Erlenmeyer flasks using a 2% inoculum. The inoculated flasks were incubated for 4 days at 28° C. on a 220 r.p.m. shaker. Assays of the fermented broth using the standard disc assay procedure with *Proteus vulgaris* MB–838 after 3 and 4 days of incubation on the centrifuged broth showed the presence of 6.2 and 6.8 units of (−) (cis-1,2-epoxypropyl)-phosphonic acid activity respectively.

EXAMPLE 26

A portion of the inoculum prepared by incubating *Streptomyces wedmorensis* in the yeast extract-glucose medium described in Example 25 was used to inoculate (2% inoculum) 50 ml. of sterile aqueous mediums containing 2% tomato paste and 2% precooked oatmeal in 250 ml. Erlenmeyer flasks. The resulting flasks were incubated for 4 days at 28° C. on a 220 r.p.m. shaker. Assays of the fermented centrifuged broth after 3 and 4 days of incubation by the standard disc assay procedure with *Proteus vulgaris* MB–838 showed the presence of 3.7 and 3.5 units of (−) (cis-1,2-epoxypropyl)-phosphonic acid activity respectively. Additional assays on the clarified broth by the same assay procedure run at 25° C. and 37° C. gave zones of inhibition of 7 mm. (the zone of the 7 mm. disc) and 37 mm. respectively.

EXAMPLE 27

A solution of 5.1 g. of the (+) phenethylamine salt of (−) (1,2-epoxypropyl)-phosphonic acid in 15 ml. of water was passed through a column of 81 ml. of a strongly acidic polystyrene-type cation exchange resin (Dowex 50X4) on the hydrogen cycle; and the column developed with water. After a fore-run of 41 ml. (−) (1,2-epoxypropyl)-phosphonic acid started to appear in the eluate, which was signalled by a drop in pH to below about 1, the next 40 ml. of the eluate was immediately frozen and lyophilized at 25 microns pressure. The residue consisted of crystalline (−) (cis-1,2-epoxypropyl)-phosphonic acid which melted instantly at temperatures above about 94° C. when placed in a preheated oil bath at this temperature or above. When the melting point is determined by heating the sample from room temperature, even when heated at the rate of 60°/min., no melting is observed even upon heating to 170° C. The crystalline product had the following rotations at 2.5° C.: −8.7° at 578 mμ, −7.84 at 546 mμ, −12.6 at 436 mμ, and −16.1 at 405 mμ.

EXAMPLE 28

To 27.7 g. of mono-(+)-α-phenethylammonium (−) (cis-1,2-epoxypropyl)-phosphonate was added 87 ml. of 1.18 N sodium methoxide-methanol solution, and the mixture stirred until all of the solids dissolved. The solution was cooled to 10° C. and filtered. To this filtered solution was added 87 ml. of sodium methoxide-ethanol solution (1.15 N) (prepared by dissolving 57.87 g. of sodium methoxide in 900 ml. of anhydrous ethanol) with stirring under a nitrogen atmosphere. To this solution was added 81 ml. of absolute ethanol, and the mixture stirred at 0° C. for 30 minutes and then at room temperature for 2 hours. The mixture was then filtered and the solid disodium (−) (cis-1,2-epoxypropyl)-phosphonate was washed with 200 ml. of ethanol and dried to constant weight at 60° C. in vacuo. A 5% solution of the disodium salt had a pH of 8.85, an $$[\alpha]_{405\ m\mu}^{28°\ C.} = -13.9° \text{ and an } [\alpha]_{D}^{28\ C.} = -5.1°$$

EXAMPLE 29

A solution of 4.9 g. of the mono-benzylamine salt of (−) (cis-1,2-epoxypropyl)-phosphonic acid in 50 ml. of water was cooled to 0–5° C. and passed over a column containing 33 ml. of a sulfonic acid cation exchange resin of the polystyrene type (Dowex 50) on the acidic cycle at 2–4 ml. per minute; the resin having previously been cooled to 0–2° C. The resin column was then washed with 225 ml. of 0–5° C. water at the same rate. The effluents were collected directly in an agitated solution of 1.50 g. of sodium hydroxide in 10 ml. of water and the pH of the resulting solution was then adjusted to pH 8.7 by the addition of dilute sodium hydroxide. This solution was concentrated in vacuo at 25° C. or less to a net weight of about 15–20 g. and to this largely solidified product was added 30 ml. of methanol with stirring. To the resulting slurry is added 125 ml. of isopropanol and this mixture was concentrated to about 75 ml. in vacuo at <25° C. The volume was then readjusted to 125 ml. with isopropanol, stirred for 15 minutes and filtered. The solid filter cake consisting of disodium (−) (cis-1,2-epoxypropyl)-phosphonate was dried at 60° C. in vacuo overnight. A 5% solution of the disodium salt in water had a pH of 8.5 and an $$[\alpha]_{495\ m\mu}^{28°\ C.} = -14.2°$$

When the foregoing process was repeated using an equivalent amount of potassium hydroxide in place of the sodium hydroxide dipotassium (−) (cis-1,2-epoxypropyl)-phosphonate was obtained. A 5% aquous solution of this product in water had a pH of 8.8–9.0 and an $$[\alpha]_{405\ m\mu}^{28°\ C.} = -12.0°$$

EXAMPLE 30

To 3.6 g. of disodium salt and 4.28 g. of dipotassium salt was added sufficient water to dissolve the salts. The resulting solution was concentrated to dryness in vacuo at <25° C. to obtain the monosodium monopotassium mixed salt of (−) (cis-1,2-epoxypropyl)-phosphonic acid. A 5% solution of this mixed salt had a pH of 8.8–9.0 and an $$[\alpha]_{405\ m\mu}^{28°\ C.} = -12.8°$$

EXAMPLE 31

Mono-α-(+)-phenethylammonium (−) (cis-1,2-epoxypropyl)-phosphonate monohydrate, 27.7 g. (0.1 mole), was dissolved in 450 ml. of water. This solution was stirred with magnesium oxide, 8.0 g. (0.2 mole), for 3 hours at 0–5° C. The excess magnesium oxide was filtered off and the filtrate concentrated in vacuo to 100 grams. The concentrate was diluted with 100 ml. of methanol and 800 ml. of isopropanol was slowly added. The precipitate is filtered and the cake washed with 200 ml. of isopropanol and dried in vacuo to give 14.5 g. of magnesium (−) (cis-1,2-epoxypropyl)-phosphonate dihydrate having $$[\alpha]_{405\ m\mu}^{28°\ C.} = -13\ (c. = 5\%,\ \text{water})$$

EXAMPLE 32

A cooled (0–5° C.) solution of 32 g. of mono-(+)-(α)-phenethylammonium (−) (cis-1,2-epoxypropyl) - phosphonate in 480 ml. of water was passed over 200 ml. of a sulfonic acid cation exchange resin of the polystyrene-type (Dowex 50) on the hydrogen cycle at a flow rate of about 15 ml. per minute. The effluent and the succeeding 400 ml. of cold water-wash was collected in a solution of 4.6 g. of sodium hydroxide in 50 ml. of water. The pH of the resulting solution was 5.4 and was adjusted to 7.0 with 6 N sodium hydroxide solution. The resulting solution was reduced in vacuo at 25° C. to a volume of about 75 ml. This concentrate was then filtered to obtain a 20% solution of sesqui sodium (−) (cis-1,2-epoxypropyl)-phosphonate. Evaporation of the solution in vacuo at a temperature of <25° C. afforded the sesqui sodium salt as a white solid. A 2% solution of this product in water has a pH of 6.8 and an $$[\alpha]_{405\ m\mu}^{28°\ C.} = -14.9°$$

EXAMPLE 33

Following the procedures of Example 32 but using an equivalent amount of the appropriate amine, the following amine salts were obtained mono-(+)-amphetammonium (−) (cis-1,2-epoxypropyl)-phosphonate, melting at 163.5–165° C.
monoethylammonium (−) (cis-1,2-epoxypropyl)-phosphonate, melting at 152–153° C.
monodiethylammonium (−) (cis-1,2-epoxypropyl)-phosphonate, melting at 120.5–122.5° C.
mono-6-threo-1-phenyl-1,3-dihydroxy-2-propylammonium (−) (cis-1,2-epoxypropyl)-phosphate, melting at 103–105° C.
ethylenediamine salt of (−) (cis-1,2-epoxypropyl)-phosphonate, melting at 98–100° C.
mono-piperizine salt of (−) (cis-1,2-epoxypropyl)-phosphonic acid, melting at 188° C.
diethylenetriamine salt of (−) (cis-1,2-epoxypropyl)-phosphonic acid, melting at 177–179° C.
hexamethylene-1,6-diamine salt of (−) (cis-1,2-epoxypropyl)-phosphonic acid, melting at 194° C.
N,N'-dibenzylethylenediamine salt of (−) (cis-1,2-epoxypropyl)-phosphonic acid, melting at 151–152° C.
bis-guanidine salt of (−) (cis-1,2-epoxypropyl)-phosphonic acid, melting at 235–260° C.
ethylenediamine-N,N'-bis (−) (cis-1,2-epoxypropyl)-phosphonate, melting at 175–210° C.
mono-ethyl glycinate salt of (−) (cis-1,2-epoxypropyl)-phosphonic acid.
mono-L-(+)-lysine (−) (cis-1,2-epoxypropyl)-phosphonate, melting at 165–195° C.
mono-(−)-brucine (−) (cis-1,2-epoxypropyl)-phosphonate, melting at 210–220° C.
mono-procaine (−) (cis-1,2-epoxypropyl)-phosphonate, melting at 121–125° C.

EXAMPLE 34

To a solution of 5.27 g. of mono-(+)-α-phenethylammonium (−) (cis-1,2-epoxypropyl)-phosphonate monohydrate in 27 ml. of water was added about 1.16 ml. of 50% sodium hydroxide to a final pH of about 9.0. The resulting solution was filtered and to this solution was added a filtered solution of 3.35 g. of calcium acetate monohydrate dissolved in 13 ml. of water at a temperature below about 30° C. The resulting white slurry was aged about 45 minutes and then filtered. The wet cake was washed with water to remove the phenethylamine. The resulting calcium (−) (cis-1,2-epoxypropyl)-phosphonate monohydrate was air-dried and had an $$[\alpha]_{405\ m\mu}^{28°\ C.} = -11.8°$$

at concentration of 5% in aqueous ethylenediamine tetraacetic acid at pH 8.8.

EXAMPLE 35

A cooled (0–5° C.) of 11.08 g. of mono-(+)-α-phenethylammonium (−) (cis-1,2-epoxypropyl)-phosphonate in 160 ml. of water was passed over 120 ml. of a sulfonic acid cation exchange resin of the polystyrene-type (Dowex 50) on the hydrogen cycle at a flow rate of about 5 ml. per minute. The effluent and the succeeding 125 ml. of cold water wash was collected and 7.5 g. of aluminum nitrate monohydrate was added. The pH of the solution was then adjusted to 6.0 with 50% sodium hydroxide, and then evaporated to about 32.3 g. in vacuo at <25° C. To this concentrate was added 58 ml. of ethanol and the solution was stirred for an hour. 25 ml. of ethanol was added and the solution was filtered. The solid aluminum salt of (−) (cis-1,2-epoxypropyl)-phosphonic acid was washed with ethanol and dried at 60° C. in vacuo.

What is claimed is:
1. An antibacterial composition comprising an effective antibacterial amount of (−) (cis-1,2-epoxypropyl)phosphonic acid or a pharmaceutically acceptable salt thereof and a carrier.
2. A process for the production of (−) (cis-1,2-epoxypropyl)phosphonic acid which comprises growing a (−) (cis-1,2-epoxypropyl)phosphonic acid producing *Streptomyces* from the group consisting of *Streptomyces fradiae* NRRL B–3357, B–3358, B–3359, B–3360 or 3417, *Streptomyces viridochromogenes* NRRL 3413, 3414, 3415, 3416 or 3427 and *Streptomyces wedmorensis* NRRL 3426 in an aqueous nutrient medium under aerobic conditions until substantial antibiotic activity is imparted to said medium.
3. A process according to claim 2 wherein the Streptomyces is a strain of *Streptomyces fradiae* NRRL B–3357, B–3358, B–3359, B–3360 or 3417.
4. A process according to claim 2 wherein the Streptomyces is a strain of *Streptomyces viridochromogenes* NRRL 3413, 3414, 3415, 3416 or 3427.
5. A process according to claim 2 wherein the Streptomyces is a strain of *Streptomyces wedmorensis* NRRL 3426.
6. A process for the production of (−) (cis-1,2-epoxypropyl)phosphonic acid which comprises growing a (−) (cis-1,2-epoxypropyl)phosphonic acid producing strain of Streptomyces from the group consisting of *Streptomyces fradiae* NRRL B–3357, B–3358, B–3359, B–3360 or 3417, *Streptomyces viridochromogenes* NRRL 3413, 3414, 3415, 3416 or 3427 and *Streptomyces wedmorensis* NRRL 3426 in an aqueous nutrient medium under aerobic conditions until substantial antibiotic activity is imparted to said medium, and recovering (−) (cis-1,2-epoxypropyl) phosphonic acid from the resulting fermentation broth.
7. A process according to claim 6 wherein the Streptomyces is *Streptomyces fradiae* NRRL B–3357, B–3358, B–3359, B–3360 or 3417.
8. A process according to claim 6 wherein the Streptomyces is *Streptomyces viridochromogenes* NRRL 3413, 3414, 3415, 3416 or 3427.
9. A process according to claim 6 wherein the Streptomyces is *Streptomyces wedmorensis* NRRL 3426.

(References on following page)

References Cited

FOREIGN PATENTS 1,046,047 12/1958 Germany _____ 424—203
1,087,066 10/1967 Great Britain _____ 424—203

OTHER REFERENCES

Churi et al., J. of Am. Chem. Soc., 83, 1966, pp. 1824–5.

Chemical Abstracts 62:10457(f) (1965).

Arbuzov et al., Isomerization of Diethoxyphosphoralkene, pp. 1110–1111 (1966).

Derwent Farm Doc. #35,893, Abstracting BE 718507, published Jan. 24, 1969.

JEROME D. GOLDBERG, Primary Examiner

U.S. Cl. X.R.

195—80; 260—268 K, 283 P, 348 R